(12) United States Patent
Awad

(10) Patent No.: US 11,398,894 B2
(45) Date of Patent: Jul. 26, 2022

(54) SYSTEM, METHOD AND COMPUTER READABLE MEDIUM FOR FILE ENCRYPTION AND MEMORY ENCRYPTION OF SECURE BYTE-ADDRESSABLE PERSISTENT MEMORY AND AUDITING

(71) Applicant: UNIVERSITY OF CENTRAL FLORIDA RESEARCH FOUNDATION, INC., Orlando, FL (US)

(72) Inventor: Amro Awad, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 624 days.

(21) Appl. No.: 16/447,242

(22) Filed: Jun. 20, 2019

(65) Prior Publication Data

US 2019/0392166 A1    Dec. 26, 2019

Related U.S. Application Data

(60) Provisional application No. 62/687,360, filed on Jun. 20, 2018.

(51) Int. Cl.
*H04L 9/06* (2006.01)
*G06F 16/16* (2019.01)
(Continued)

(52) U.S. Cl.
CPC .......... *H04L 9/0618* (2013.01); *G06F 3/0632* (2013.01); *G06F 3/0634* (2013.01);
(Continued)

(58) Field of Classification Search
CPC ................ H04L 9/0618; G06F 16/164; G06F 16/2228; G06F 16/13; G06F 3/0623;
(Continued)

(56) References Cited

U.S. PATENT DOCUMENTS

2004/0010701 A1* 1/2004 Umebayashi ....... G06F 21/6227
713/193
2018/0304145 A1* 10/2018 Finnerty ............ G06K 15/4095

OTHER PUBLICATIONS

Widiasari, Indrastanti R. "Combining advanced encryption standard (AES) and one time pad (OTP) encryption for data security." International Journal of Computer Applications 57.20 (2012). (Year: 2012).*

(Continued)

*Primary Examiner* — Charles Rones
*Assistant Examiner* — Hewy H Li
(74) *Attorney, Agent, or Firm* — Timothy H. Van Dyke; Wolter, Van Dyke, Davis, PLLC

(57) ABSTRACT

A method comprising initializing, by a processor, a field identification (FID) field and a file type field in a memory encryption counter block associated with pages for each file of a plurality of files stored in a persistent memory device (PMD), in response to a command by an operating system (OS). The file type field identifies whether each file associated with FID field is one of an encrypted file and a memory location. The method includes decrypting data of a page stored in the PMD, based on a read command by a requesting core. When decrypting, determining whether the requested page is an encrypted file or memory location. If the requested page is an encrypted file, performing decryption based on a first encryption pad generated based on the file encryption key of the encrypted file and a second encryption pad generated based on a processor key of the secure processor.

20 Claims, 17 Drawing Sheets

(51) Int. Cl.
  *G06F 16/22*    (2019.01)
  *G06F 16/13*    (2019.01)
  *G06F 3/06*     (2006.01)
  *G06F 12/0882*  (2016.01)
  *H03M 13/05*    (2006.01)
  *G06F 21/62*    (2013.01)

(52) U.S. Cl.
  CPC .......... *G06F 3/0656* (2013.01); *G06F 3/0673* (2013.01); *G06F 12/0882* (2013.01); *G06F 16/13* (2019.01); *G06F 16/164* (2019.01); *G06F 16/2228* (2019.01); *H04L 9/0637* (2013.01); *G06F 3/0623* (2013.01); *G06F 3/0659* (2013.01); *G06F 21/6227* (2013.01); *G06F 2212/304* (2013.01); *G06F 2221/2101* (2013.01); *H03M 13/05* (2013.01)

(58) Field of Classification Search
  CPC .... G06F 3/0632; G06F 3/0634; G06F 3/0656; G06F 3/0659; G06F 3/0673; G06F 12/0882; G06F 21/6227; G06F 2212/304; G06F 2221/2101; H03M 13/05
  See application file for complete search history.

(56)    References Cited

OTHER PUBLICATIONS

G. Cattaneo et al., "Design and Implementation of a Transparent Cryptographic File System for Unix", Conference Paper, Jan. 2001, 6 pages.

Michael Austin Halcrow, "eCryptfs: An Enterprise-class Encrypted Filesystem for Linux", Jul. 2005 Linux Symposium, Ottawa, Ontario, Canada; 20 pages.

\* cited by examiner

SYSTEM, METHOD AND COMPUTER READABLE MEDIUM FOR FILE ENCRYPTION AND MEMORY ENCRYPTION OF SECURE BYTE-ADDRESSABLE PERSISTENT MEMORY AND AUDITING

CO-PENDING APPLICATIONS

This application claims priority benefit of Provisional Application No. 62/687,360, filed Jun. 20, 2018, titled "TECHNIQUES FOR SECURE BYTE-ADDRESSABLE PERSISTENT MEMORY MANAGING," to the same assignee University of Central Florida Research Foundation, Inc., and being incorporated herein by reference as if set forth in full below.

BACKGROUND

The embodiments are directed to a method, system and computer readable instructions for file encryption and memory encryption of a secure byte-addressable persistent memory. The method, system and computer readable instructions for a secure byte-addressable persistent memory may provide filesystem auditing.

Unlike traditional storage systems, emerging non-volatile memory (NVM) technologies are expected to be offered on a memory-module form factor, thus can be accessed through the memory bus using typical memory load/store operations. Compared to other storage technologies, such as flash-based drives, emerging NVMs are expected to be orders of magnitude faster, can endure orders of magnitude more writes, and have promising densities. Accordingly, emerging NVMs are expected to revolutionize storage systems.

SUMMARY

The embodiments are directed to a method, system and computer readable instructions for file encryption and memory encryption of a secure byte-addressable persistent memory. The method, system and computer readable instructions for a secure byte-addressable persistent memory may provide filesystem auditing.

A set of embodiments include a method comprising: initializing, by a memory controller of a secure processor, a file identification (FID) field and a file type field in a memory encryption counter block associated with pages for each file of a plurality of files stored in a byte-addressable persistent memory device (PMD), in response to a command by an operating system (OS). The file type field identifies whether said each file associated with FID field is one of an encrypted file and a memory location. The method includes decrypting, by an encryption/decryption engine, data of a page stored in the byte-addressable PMD, in response to a read command by a requesting core. The decrypting comprises: determining whether the requested page is an encrypted file or memory location; and in response to the requested page being an encrypted file, performing decryption based on a first encryption pad generated as a function of a file encryption key (FEK) of the encrypted file and a file encryption counter and a second encryption pad generated as a function of a processor key of the secure processor and a counter associated with the memory encryption counter block.

Another set of embodiments include a tangible and non-transitory computer readable medium having instructions stored thereon which when executed by a secure processor causes the secure processor to: initialize a file identification (FID) field and a file type field in a memory encryption counter block associated with pages for each file of a plurality of files stored in a byte-addressable persistent memory device (PMD), in response to a command by the OS, wherein the file type field identifies whether said each file associated with FID field is one of an encrypted file and a memory location; and decrypt, by an encryption/decryption engine, data of a page stored in the byte-addressable PMD, in response to a read command by a requesting core. The instructions to decrypt causes the processor to determine whether the requested page is an encrypted file or memory location; and in response to the requested page being an encrypted file, perform decryption based on a first encryption pad generated as a function of a file encryption key (FEK) of the encrypted file and a file encryption counter and a second encryption pad generated as a function of a processor key of the secure processor and a counter associated with the memory encryption counter block.

Another set of embodiments include a system including a secure processor having a memory controller and an executable operating system (OS), the processor executing instructions stored in tangible and non-transitory memory configured to cause the processor to: initialize a file identification (FID) field and a file type field in a memory encryption counter block associated with pages for each file of a plurality of files stored in a byte-addressable persistent memory device (PMD), in response to a command by the OS, wherein the file type field identifies whether said each file associated with FID field is one of an encrypted file and a memory location; and decrypt, by an encryption/decryption engine, data of a page stored in the byte-addressable PMD, in response to a read command by a requesting core. The instructions to decrypt causes the processor to determine whether the requested page is an encrypted file or memory location; and in response to the requested page being an encrypted file, perform decryption based on a first encryption pad generated as a function of a file encryption key (FEK) of the encrypted file and a file encryption counter and a second encryption pad generated as a function of a processor key of the secure processor and a counter associated with the memory encryption counter block.

Another set of embodiments include a method comprising: tracking, for each core of a plurality of cores, a process identification (PID) associated with a current process for said each core, wherein the PID is accessible by an operating system (OS) executed by a processing unit; generating, by a memory controller, a file identification (FID) associated with a direct access to file (DAX) filesystem file in response to a command from the OS; determining, by a memory controller, a current index of a designated buffer, in a secure persistent memory device, for which to store access auditing information associated with the DAX filesystem file; and for each corresponding DAX filesystem file of a plurality of DAX filesystem files stored in the secure persistent memory device, tracking access auditing information including the generated FID, an associated PID, access type, current timestamp and a physical address associated with the current index of the designated buffer for which the auditing information is stored, in response to the corresponding DAX filesystem file being accessed and/or modified.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Figure 1A:
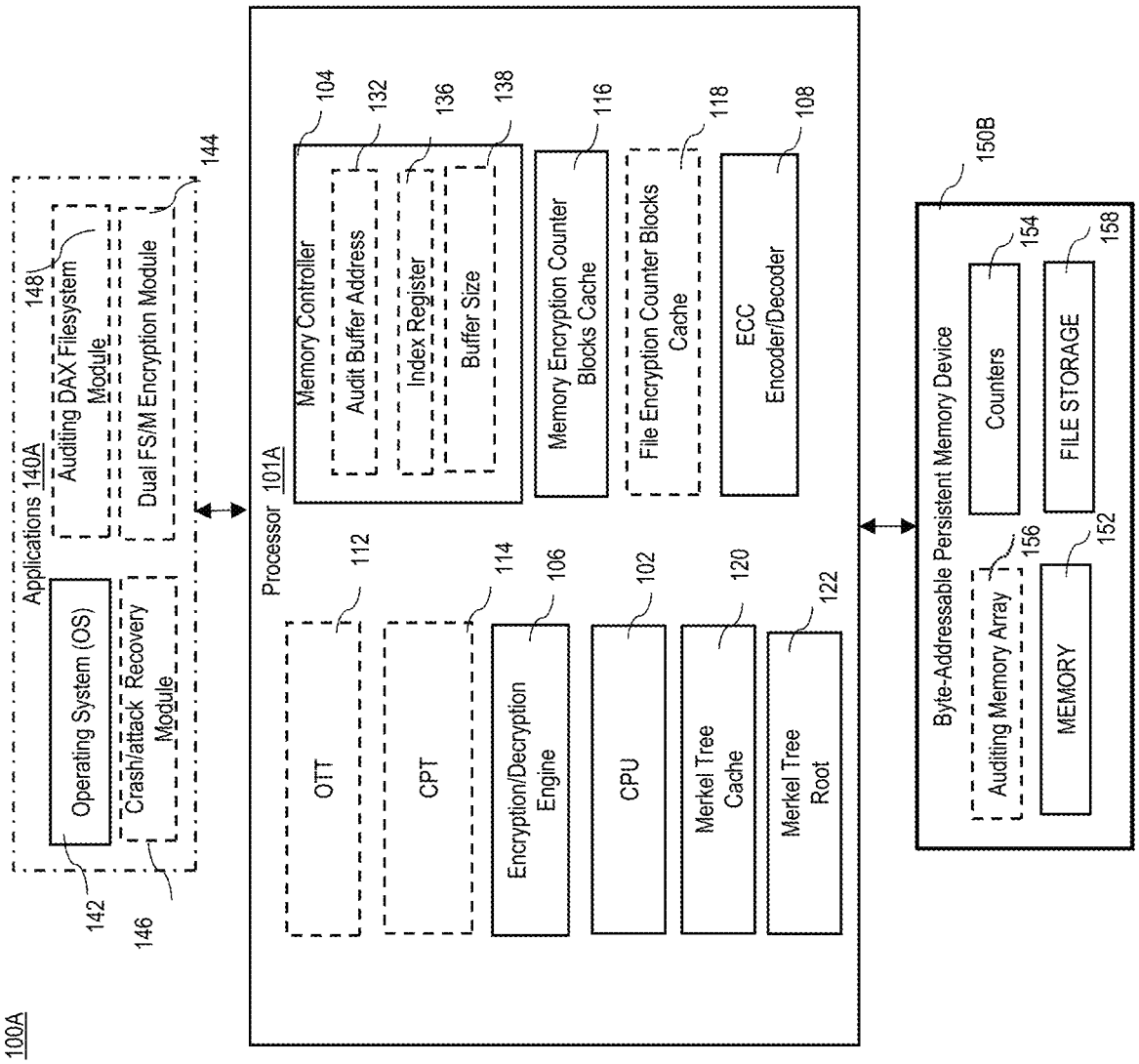
FIG. 1A illustrates a secure byte-addressable persistent memory managing system according to some embodiments.

A method and system are described for managing counter-mode encryption/decryption of secure persistent memory devices, such as a secure byte-addressable persistent memory device. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two (e.g., "about X" implies a value in the range from 0.5× to 2×), for example, about 100 A implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

Some embodiments of the invention are described below in the context of management of persistent memory devices for counter-value recovery of encryption counters in counter-mode encryption processes. However, the invention and embodiments are not limited to this context. In other embodiments, the invention is described below in the context of management of byte-addressable persistent memory devices for selective dual filesystem and memory (FS/M) encryption/decryption in counter-mode encryption processes. Still further, other embodiments of the invention are described below in the context of management of persistent memory devices for auditing direct access to file (DAX) filesystem files in encrypted memory devices and non-encrypted memory devices.

The solutions herein may include a co-design of hardware and software implementations in a processor chip and/or secure persistent memory device.

Counter-mode encryption security is considered a highly secure encryption methodology. Specifically, counter-mode encryption may prevent snooping attacks, dictionary-based attacks, known-plaintext attacks and replay attacks, for example, in some instances. However, persisting encryption counters used in the counter-mode encryption is not only critical for system restoration, such as, without limitation, after a system crash, but also a security requirement. Reusing old/wrong encryption counters (i.e., those which have not been persisted on memory during crash) can result in meaningless data after decryption. Moreover, losing most-recent counters entails a variety of cyberattacks wherein counter-mode encryption security strictly depends on the uniqueness of encryption counters used for each encryption. The term "cyberattack" is interchangeable with the term "attack."

The techniques herein may manage the secure persistent memory device through at least one of a crash recovery mechanism and attack recovery mechanism for counters in a counter-mode encryption process; and selective dual files system/memory (FS/M) encryption methodology incorporating filesystem encryption counter blocks and memory encryption counter blocks. The techniques herein may manage the persistent memory device through filesystem auditing.

FIG. 1A illustrates a secure byte-addressable persistent memory managing (PMM) system 100A according to some embodiments, for use in a computing system, as will be described in more detail in relation to FIG. 5 and chip set, as will be described in more detail in relation to FIG. 6.

Figure 5:
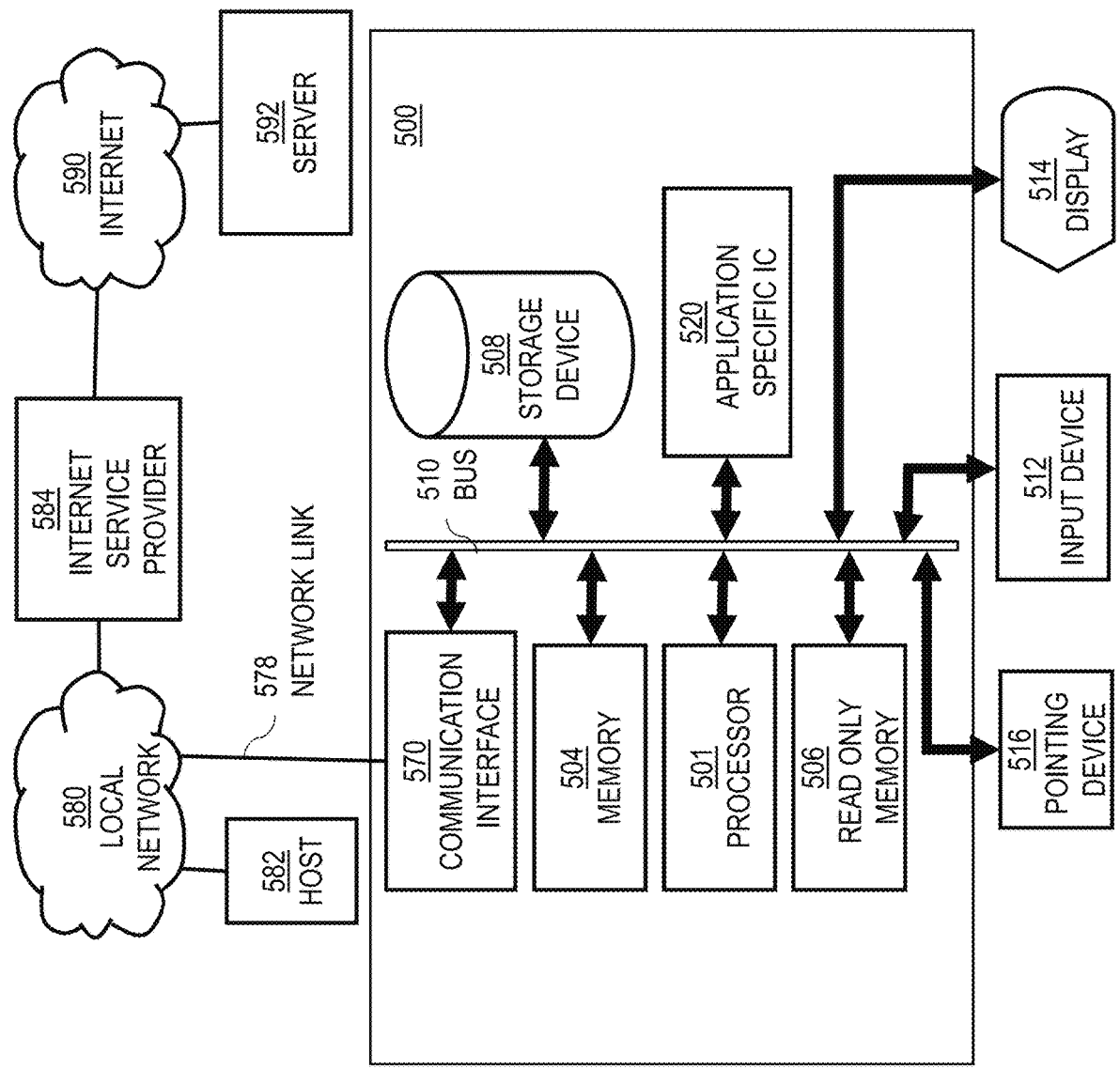
FIG. 5 illustrates a block diagram of a computer system upon which embodiments of the invention may be implemented.

The PMM system 100A may be incorporated in a computing system (FIG. 5). The PMM system 100A may comprise a physically secure processor 101A and an attacker accessible byte-addressable persistent memory device 150A in communication therewith. The persistent memory device (PMD) 150A may be incorporated in memory 605, as described in relation to FIG. 6. The PMD 150A includes a portion used as memory 152 and a portion used to store directly accessible files 158 in a files system. The physically secured processor 101A may include a MT root 122 and a Merkel Tree (MT) 120. In some embodiments, the Merkel Tree cache 120, but not the Merkel Tree root 122, is on the PMD 150. The Merkel Tree is stored in the Merkel Tree cache 120 except the root of the Merkel Tree may be stored in a separate cache, in some embodiments. The dashed boxes illustrated in FIG. 1A denote that the boxes are optional in some embodiments and may be omitted. Furthermore, the dashed boxes in the processor 101A and the persistent memory device 150A also denote added hardware components for carrying out the methods described herein. Added hardware may not include additional hardware per se but instead designation and assignment of available memory registers/buffers, circuits, and communication paths for performing the acts described herein.

The PMM system 100A may comprise encryption/decryption engine 106, central processing unit (CPU) 102 and memory controller 104. The encryption/decryption engine 106 may be configured as one or more engines. For example, the encryption/decryption engine 106 may perform memory encryption/decryption based on a counter-mode encryption scheme using a processor/memory encryption key known by the processor 101A. Alternately, the engine 106 may perform memory encryption/decryption using a processor/memory encryption key and filesystem encryption/decryption using a designated file encryption key (FEK) for the filesystem file using a counter-mode encryption scheme. In some embodiments, the memory encryption/decryption (first phase) and the filesystem encryption/decryption (second phase) may be performed in series. However, the corresponding encryption/decryption pads for the first phase and the second phase may be generated in parallel. The terms "first" and "second" are not intended to denote priority of one phase over another. In some embodiments, by way of non-limiting example, the first phase may include the filesystem encryption/decryption using bitwise modular addition; and the second phase may include the memory encryption/decryption using bitwise modular addition.

The PMM system 100A may include memory encryption counter blocks cache 116 for use in encrypting data to be stored in the byte-addressable persistent memory device 150A which provides counters 154 configured to be loaded in the counter blocks cache 116 and 118. The cache counters are used to populate fields of an initialization vector (IV) used in the encryption operation, for example. The IV is paired with a corresponding encryption key to generate an encryption/decryption pad used to encrypt/decrypt the data of a file. The term "counter block" whether for file encryption or memory encryption is corresponding representative data stored in the hardware of a cache or type of memory devices.

The PMM system 100A may comprise applications 140A denoted in a dash, dot box, configured with instructions or program code to execute one or more of the method blocks/steps described herein. The applications 140A may be stored in memory devices shown in FIG. 5. For the sake of brevity, not all applications for operating the processor and computing system (FIG. 5) are described herein such as for displaying files, interfacing with user input devices, network communications, etc., well known in computing technology.

The applications 140A may include an operating system (OS) 142. The applications 140A may comprise crash/attack recovery module 146, denoted in dashed box, for managing the persistent memory device 150A through at least one of a crash recovery mechanism and an attack recovery mechanism for counters in a counter-mode encryption process. The recovery of the counter values is described in relation to FIG. 2.

The processor 101A may include error correction code (ECC) encoder/decoder 108 configured to encode data of a file with a generated ECC and decode decrypted data with the ECC. The ECC may be configured to correct one or more errors in the decrypted data. Recovery, whether caused by a crash or cyberattack, may use the ECC for a security check of the encryption counter values, after decryption and decoding. The crash/attack recovery module 146 may be configured to recover the counter value if the counter value is invalid, as described in more detail in relation to FIG. 2. An invalid counter value may be the result of a system crash or a cyberattack. In some embodiments, a set of N counter values may be checked to recover the most-recent counter value using the ECC bits, where N is an integer.

After all memory locations are vested, the MT 120 may be reconstructed with the recovered counter values to build up any corresponding intermediate nodes and the MT root 122. Additionally, the resulting MT root 122 (FIG. 1A) may be compared with that saved and kept in the processor 101A. However, if a mismatch occurs, then the data integrity in the memory device cannot be verified and it is very likely that an attacker has replayed both counter and corresponding encrypted data+ECC blocks, in the case of a cyberattack. The mismatch may occur in the case of a crash.

The processor 101A may include an open tunnel table 112, a current process table 114 and filesystem encryption counter blocks cache 118, denoted in dashed boxes. Further, the applications 140A may include a dual FS/M encryption module 144, denoted in a dashed box, for managing selective dual FS/M encryption methodology using the open tunnel table 112, current process table 114 and filesystem encryption counter blocks cache 118. The dual FS/M encryption module 144 is configured to perform dual counter-mode encryption by incorporating filesystem encryption counter blocks cache 118 and memory encryption counter blocks cache 116. The dual FS/M encryption module 144 supports selectively encrypted DAX filesystem files and encryption of the persistent memory device 150A.

The current process table (CPT) 114 may include, for each core of a plurality of cores of the CPU 102 on the processor 101A, a current process identification (PID) by corresponding core identification (CID). Any current PID may open one or more stored files 158 in memory device 150A. Additionally, the open tunnel table (OTT) 112 may include, for each current PID, an associated FID and file encryption key (FEK), if present. One or more files may not be encrypted. Thus, non-encrypted files would not have a corresponding FEK. Moreover, each different encrypted file may have its own file encryption key which may be set by a user, administrator or other means. The OTT 112 allows different file encryption keys to be tracked and subsequently changed. The dual FS/M encryption module 144 employs the instructions to generate the data (i.e., PID, FID, CID and FEK) for populating the CPT 114 and OTT 112, as well as, use such data for selective dual encryption of a DAX filesystem file. The memory encryption counter blocks cache 116 are modified with a FID field and a file type (File?) field wherein, if the file is non-encrypted, the dual FS/M encryption module 144 does not look-up the FEK since the file would not have such an FEK, to perform memory counter-mode encryption. The File? Field also indicates whether a counter block 154 is for a file or for a memory 152 that has a processor specific encryption key.

The OTT 112, CPT 114 and file encryption counter blocks cache 118 are designated hardware components, and these components, (i.e., the OTT 112 and CPT 114) may be physically near the memory controller 104. In other words, the OTT 112 and CPT 114 may be on-board the processor chip of processor 101A. While the OTT 112 and CPT 114 are shown outside of the memory controller 104, in some embodiments the OTT 112 and CPT 114 may be added within the memory controller 104.

Nonetheless, if the file is an encrypted filesystem file, the dual FS/M encryption module 144 uses a processor/memory encryption key to generate a memory encryption/decryption pad for use in a first phase of an encryption process; and looks up the FEK of the file to generate a filesystem encryption/decryption pad for use in a second phase of the encryption process using the result of the first phase, by way of non-limiting example. The reverse may be used in some embodiments. In other words, the first phase may use the filesystem encryption/decryption pad while the second phase encrypts the result of the first phase using the memory encryption/decryption pad. The encryption and decryption operations may be symmetrical operations.

The applications 140A may include auditing DAX filesystem module 148 for managing the persistent memory device through filesystem auditing. The memory controller 104 may be modified to include one or more of an audit buffer address 132, an index register 136 and a buffer size 138, each of which is denoted as a dashed box. The persistent memory device 156 may include an auditing memory array 156, denoted in a dashed box.

In an embodiment, a global auditing region may be designated in the memory controller 104 to track accesses of all the DAX filesystem files or those files designated for auditing. In this embodiment, the global auditing region include an audit (global) buffer address 132, index register 136 and buffer size 138. Correspondingly, the auditing memory array 156 includes a global buffer for which to write a file's audit information, such as when reading and writing file data in the persistent memory device 150A. Global buffer may be physically contiguous, and its physical address and size are communicated initially to the memory controller 104 wherein the global buffer may be shared across the filesystem files, for example.

In another embodiment, a per-file auditing region may be used to hold the transactions history of the corresponding DAX filesystem file in the auditing memory array 156 of the encrypted persistent memory device 150A. Here, the per-file auditing region, the audit buffer address 132 may correspond to an audit page associated with a data page of an accessed filesystem file. The memory controller 104 may generate per-cacheline auditing information which may include the FID, an audit indicator (e.g., Audit? field) and an audit mode. The audit indicator (e.g., Audit?) may indicate whether the file is to be audited. For example, if the file is audited, the audit information or audit metadata information is stored in an auditing page with or adjacent to the data page of the filesystem file in the persistent memory device 150A. The audit mode may include a code to denote one of no auditing, read only access, write only access, and both read and write accesses.

Although processes, equipment, and/or data structures are depicted in FIG. 1A as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example, in some embodiments, the auditing DAX filesystem module 148 and auditing memory array 156 may be omitted. In other embodiments, the crash/attack recovery module 146 may be omitted. Still further, the data associated with the OTT 112 and CPT 114 may be replaced with certain metadata storage, for some applications which do not support the OTT 112 and CPT 114.

Figure 1B:
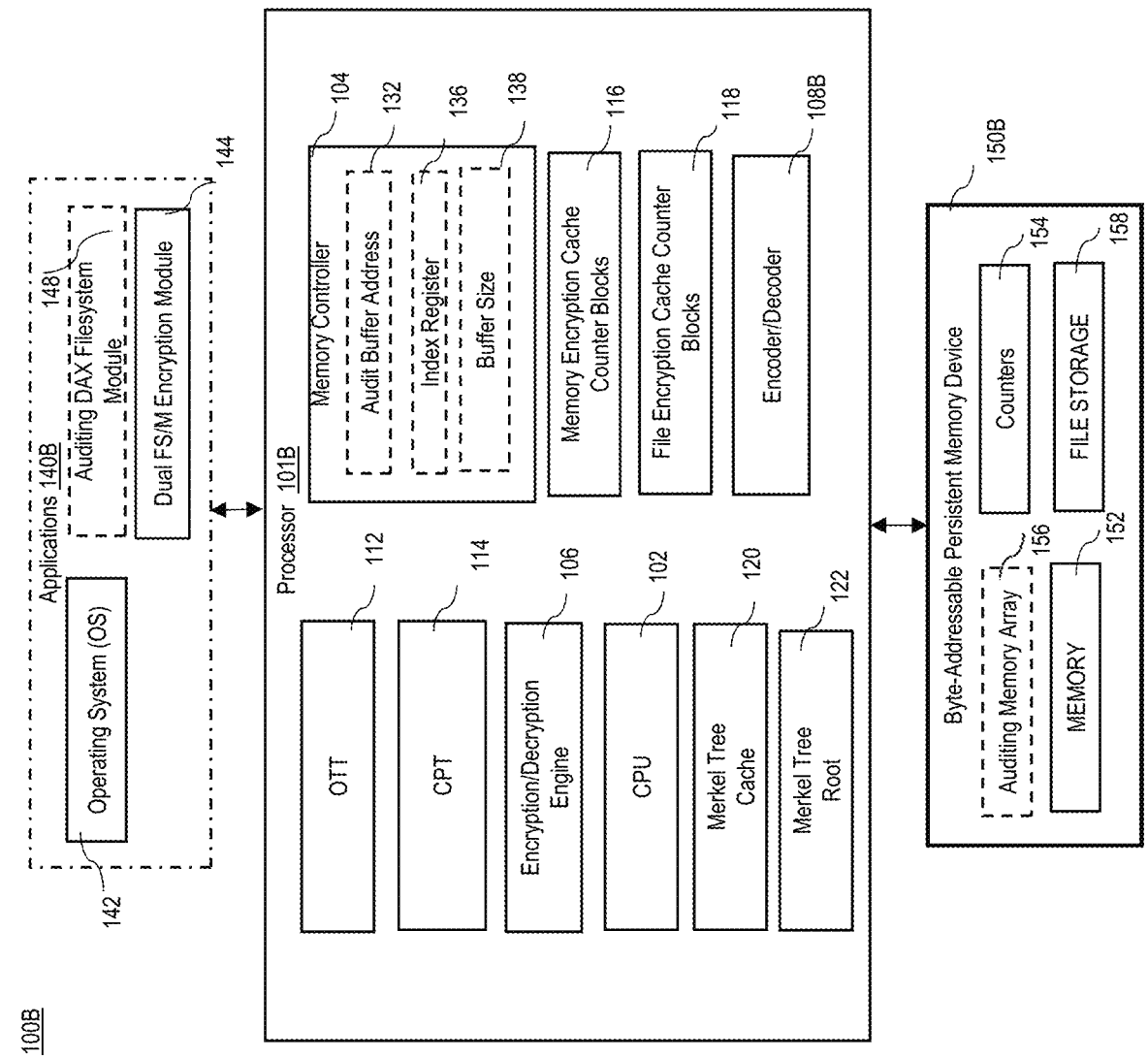
FIG. 1B illustrates a secure byte-addressable persistent memory managing system according to some embodiments.

FIG. 1B illustrates a secure byte-addressable persistent memory managing (PMM) system 100B according to some embodiments, for use in a computing system, as will be described in more detail in relation to FIG. 5 and chip set, as will be described in more detail in relation to FIG. 6.

The PMM system 100B may be incorporated in a computing system (FIG. 5). The PMM system 100B may comprise a physically secure processor 101B and an attacker accessible byte-addressable persistent memory device 150B in communication therewith. The persistent memory device (PMD) 150B may be incorporated in memory 605, as described in relation to FIG. 6. The PMD 150B includes a portion used as memory 152 and a portion used to store directly accessible files 158 in a files system. The physically secured processor 101B may include a MT root 122 and a Merkel Tree (MT) 120. In some embodiments, the Merkel Tree cache 120, but not the Merkel Tree root 122, is on the PMD 150B. The Merkel Tree is stored in the Merkel Tree cache 120 except the root of the Merkel Tree may be stored in a separate cache, in some embodiments. The dashed boxes illustrated in FIG. 1B denote that the boxes are optional in some embodiments and may be omitted. Furthermore, the dashed boxes in the processor 101B and the persistent memory device 150B also denote added hardware components for carrying out the methods described herein. Added hardware may not include additional hardware per se but instead designation and assignment of available memory registers/buffers, circuits, and communication paths for performing the acts described herein.

The PMM system 100B may comprise encryption/decryption engine 106, central processing unit (CPU) 102 and memory controller 104. The encryption/decryption engine 106 may be configured as one or more engines. For example, the encryption/decryption engine 106 may perform memory encryption/decryption based on a counter-mode encryption scheme using a processor/memory encryption key known by the processor 101B. Alternately, the engine 106 may perform memory encryption/decryption using a processor/ memory encryption key and filesystem encryption/decryption using a designated file encryption key (FEK) for the filesystem file using a counter-mode encryption scheme. In some embodiments, the memory encryption/decryption (first phase) and the filesystem encryption/decryption (second phase) may be performed in series. However, the corresponding encryption/decryption pads for the first phase and the second phase may be generated in parallel. The terms "first" and "second" are not intended to denote priority of one phase over another. In some embodiments, by way of non-limiting example, the first phase may include the filesystem encryption/decryption using bitwise modular addition; and the second phase may include the memory encryption/decryption using bitwise modular addition.

The PMM system 100B may include memory encryption counter blocks cache 116 for use in encrypting data to be stored in the byte-addressable persistent memory device 150B which provides counters 154 configured to be loaded in the counter blocks cache 116 and 118. The cache counters are used to populate fields of an initialization vector (IV) used in the encryption operation, for example. The IV is paired with a corresponding encryption key to generate an encryption/decryption pad used to encrypt/decrypt the data of a file. The term "counter block" whether for file encryption or memory encryption is corresponding representative data stored in the hardware of a cache or type of memory devices.

The PMM system 100B may comprise applications 140B denoted in a dash, dot box, configured with instructions or program code to execute one or more of the method blocks/steps described herein. The applications 140B may be stored in memory devices shown in FIG. 5. For the sake of brevity, not all applications for operating the processor and computing system (FIG. 5) are described herein such as for displaying files, interfacing with user input devices, network communications, etc., well known in computing technology. The applications 140B may include an operating system (OS) 142.

The processor 101B may include an encoder/decoder 108B configured to encode or decode data of a file. The encoder/decoder 108B may generate ECC data and decode decrypted data with the ECC. The ECC may be configured to correct one or more errors in the decrypted data. Other functions of the encoder/decoder 108B will be readily apparent from the description herein.

The processor 101B may include an open tunnel table 112, a current process table 114 and filesystem encryption counter blocks cache 118. Further, the applications 140B may include a dual FS/M encryption module 144 for managing selective dual FS/M encryption methodology using the open tunnel table 112, current process table 114 and filesystem encryption counter blocks cache 118. The dual FS/M encryption module 144 is configured to perform dual counter-mode encryption by incorporating filesystem encryption counter blocks cache 118 and memory encryption counter blocks cache 116. The dual FS/M encryption module 144 supports selectively encrypted DAX filesystem files and encryption of the persistent memory device 150B.

The current process table (CPT) 114 may include, for each core of a plurality of cores of the CPU 102 on the processor 101B, a current process identification (PID) by corresponding core identification (CID). Any current PID may open one or more stored files 158 in memory device 150B. Additionally, the open tunnel table (OTT) 112 may include, for each current PID, an associated FID and file encryption key (FEK), if present. One or more files may not be encrypted. Thus, non-encrypted files would not have a corresponding FEK. Moreover, each different encrypted file may have its own file encryption key which may be set by a user, administrator or other means. The OTT 112 allows different file encryption keys to be tracked and subsequently changed. The dual FS/M encryption module 144 employs the instructions to generate the data (i.e., PID, FID, CID and FEK) for populating the CPT 114 and OTT 112, as well as, use such data for selective dual encryption of a DAX filesystem file. The memory encryption counter blocks cache 116 are modified with a FID field and a file type (File ?) field wherein, if the file is non-encrypted, the dual FS/M encryption module 144 does not look-up the FEK since the file would not have such an FEK, to perform memory counter-mode encryption. The File? Field also indicates whether a counter block 154 is for a file or for a memory 152 that has a processor specific encryption key.

The OTT 112, CPT 114 and file encryption counter blocks cache 118 are designated hardware components, and these components, (i.e., the OTT 112 and CPT 114) may be physically near the memory controller 104. In other words, the OTT 112 and CPT 114 may be on-board the processor chip of processor 101B. While the OTT 112 and CPT 114 are shown outside of the memory controller 104, in some embodiments the OTT 112 and CPT 114 may be added within the memory controller 104.

Nonetheless, if the file is an encrypted filesystem file, the dual FS/M encryption module 144 uses a processor/memory encryption key to generate a memory encryption/decryption pad for use in a first phase of an encryption process; and looks up the FEK of the file to generate a filesystem encryption/decryption pad for use in a second phase of the encryption process using the result of the first phase, by way of non-limiting example. The reverse may be used in some embodiments. In other words, the first phase may use the filesystem encryption/decryption pad while the second phase encrypts the result of the first phase using the memory encryption/decryption pad. The encryption and decryption operations may be symmetrical operations.

The applications 140B may include auditing DAX filesystem module 148 for managing the persistent memory device through filesystem auditing. The memory controller 104 may be modified to include one or more of an audit buffer address 132, an index register 136 and a buffer size 138, each of which is denoted as a dashed box. The persistent memory device 156 may include an auditing memory array 156, denoted in a dashed box.

In an embodiment, a global auditing region may be designated in the memory controller 104 to track accesses of all the DAX filesystem files or those files designated for auditing. In this embodiment, the global auditing region include an audit (global) buffer address 132, index register 136 and buffer size 138. Correspondingly, the auditing memory array 156 includes a global buffer for which to write a file's audit information, such as when reading and writing file data in the persistent memory device 150B. Global buffer may be physically contiguous, and its physical address and size are communicated initially to the memory controller 104 wherein the global buffer may be shared across the filesystem files, for example.

In another embodiment, a per-file auditing region may be used to hold the transactions history of the corresponding DAX filesystem file in the auditing memory array 156 of the encrypted persistent memory device 150B. Here, the per-file auditing region, the audit buffer address 132 may correspond to an audit page associated with a data page of an accessed filesystem file. The memory controller 104 may generate per-cacheline auditing information which may include the FID, an audit indicator (e.g., Audit?) and an audit mode. The audit indicator (e.g., Audit?) may indicate whether the file is to be audited. For example, if the file is audited, the audit information or audit metadata information is stored in an auditing page with or adjacent to the data page of the filesystem file in the persistent memory device 150B. The audit mode may include a code to denote one of no auditing, read only access, write only access, and both read and write accesses.

The term "persistent memory device" will sometimes be used interchangeably with the term "non-volatile memory" (NVM). The term "NVM" may be used interchangeably herein with "NVM device."

Figure 2:
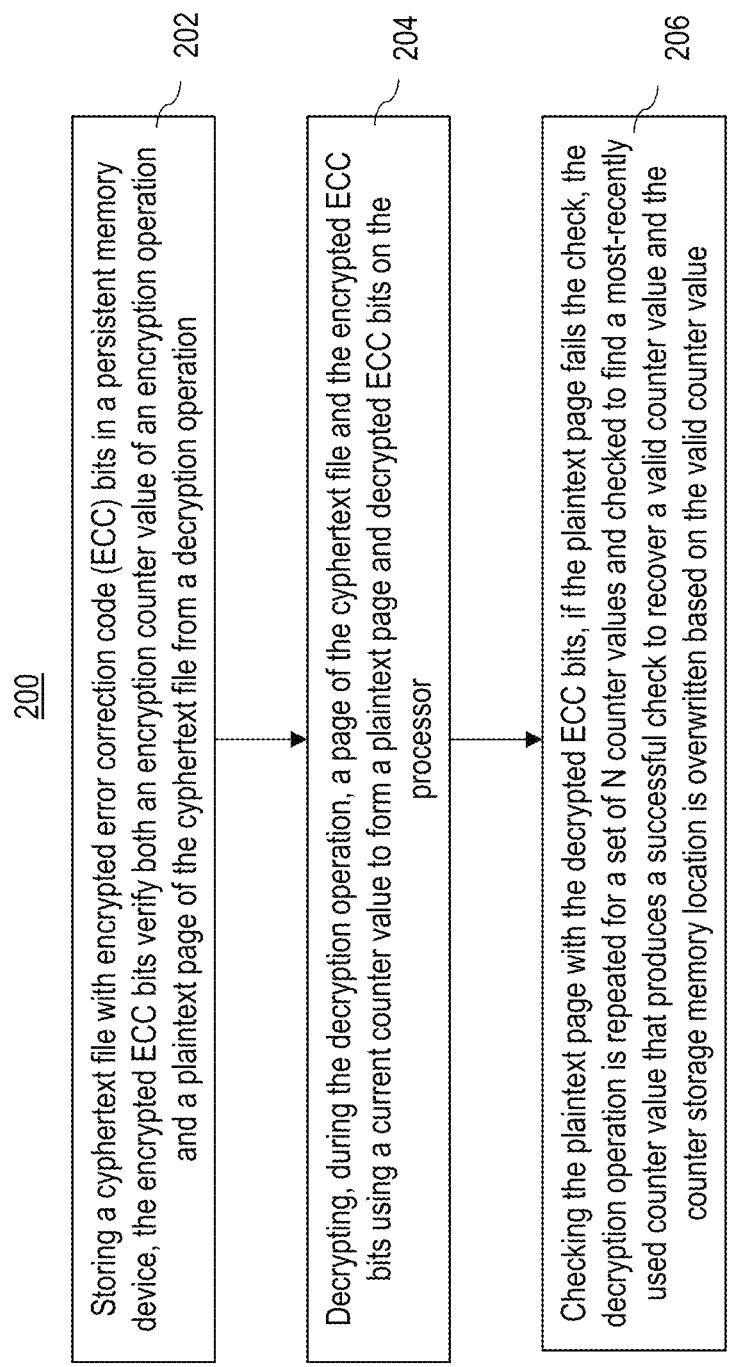
FIG. 2 illustrates a flowchart of a method for managing decryption and counter values with error correction codes (ECC) for a secure byte-addressable persistent memory, according to some embodiments.

FIG. 2 illustrates a flowchart of a method 200 for managing decryption and counter values with error correction codes (ECC) for a secure byte-addressable persistent memory, according to some embodiments. The methods described herein will be in reference to the PMM system 100A of FIG. 1A. The inventors use error-correction codes (ECC) bits for decoding, via the ECC encoder/decoder 108, a decrypted file and, additionally, to provide a sanity check for the encryption counters. The memory controller 104 (FIG. 1A) may be configured to relax the strict atomic persistence requirement through secure and fast recovery of lost encryption counters due to a crash or cyberattack using the ECC bits after decryption and decoding of the corresponding file.

The method 200 may comprise, at block 202, storing a cyphertext file with encrypted error correction code (ECC) bits in a persistent memory device 150A. The encrypted ECC bits verify both an encryption counter value of an encryption operation and a plaintext page of the cyphertext file from a decryption operation.

The method 200 may include, at block 204, decrypting, during the decryption operation, a page of the cyphertext file and the encrypted ECC bits using a current counter value to form a plaintext page and decrypted ECC bits on the processor. The method 200 may include, at block 206, checking the plaintext page with the decrypted ECC bits, if the plaintext page fails the check, the decryption operation is repeated for a set of N counter values and checked to find a most-recently used counter value that produces a successful check to recover a valid counter value and the counter storage memory location is overwritten based on the valid counter value.

The method 200 may comprise overwriting the counter storage memory location with the recovered or valid counter value. As previously described, the Merkle Tree (MT) 120 may be reconstructed with the recovered counter values to build up any intermediate nodes and the MT root 122 (FIG. 1A). In a further method block/step, for example, the resulting MT root 122 (FIG. 1A) based on the reconstructed MT 120 may then be compared with that saved and kept in the processor 101A (FIG. 1A). The method may determine that a mismatch occurred wherein the root mismatch is indicative of that the data integrity of the memory device cannot be verified. In some embodiments, the mismatch may be indicative that an attacker has replayed both counter and corresponding encrypted data+ECC blocks.

Although blocks/steps are depicted in FIG. 2, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways.

Figure 3:
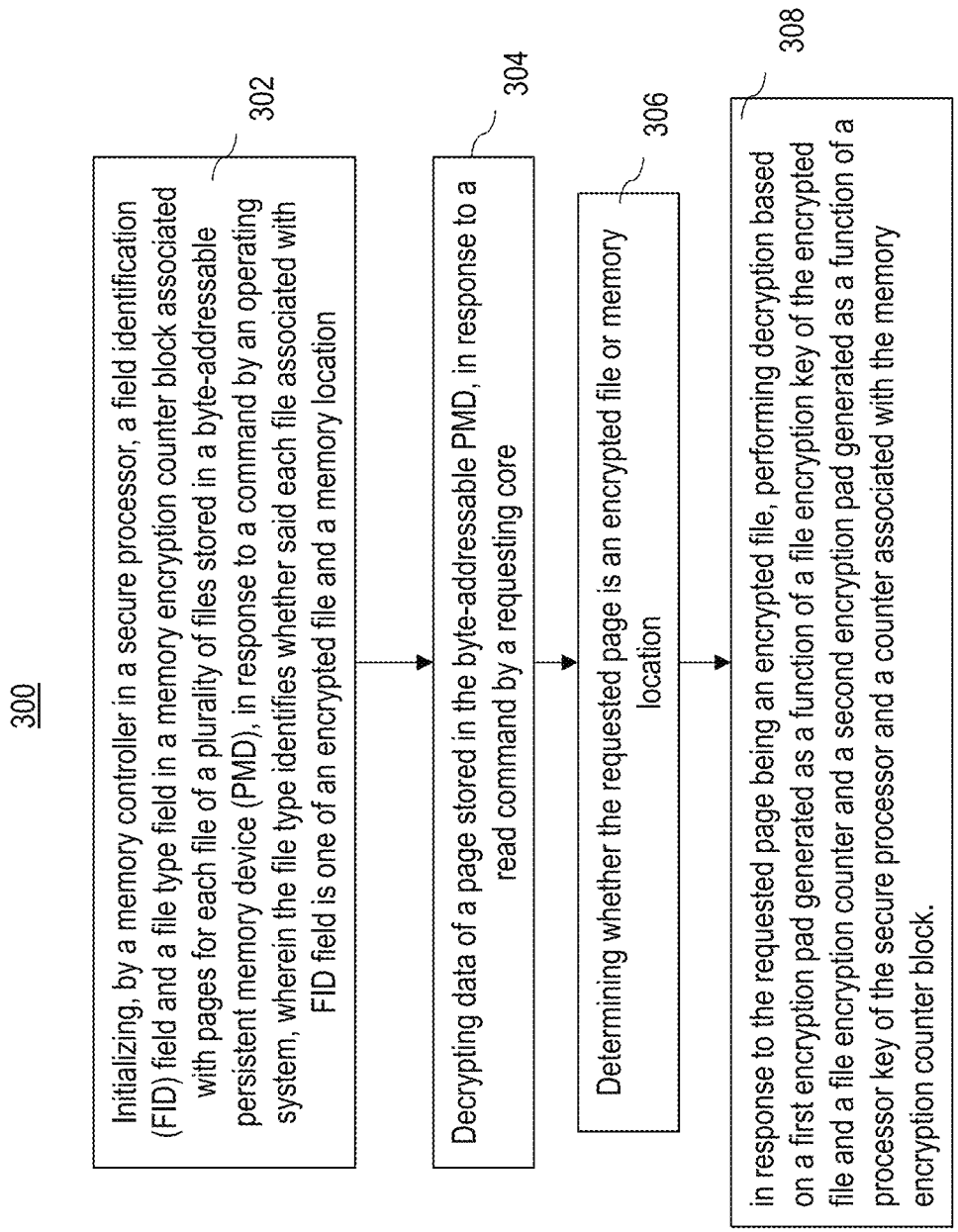
FIG. 3 illustrates a flowchart of a method for managing filesystem and memory decryption for pages stored in a secure byte-addressable persistent memory, according to some embodiments.

FIG. 3 illustrates a flowchart of a method 300 for managing filesystem and memory decryption for pages stored in a secure byte-addressable persistent memory device, according to some embodiments. While direct access to file (DAX) filesystems strive to allow the software applications to directly access files, most filesystem encryption implementations have been implemented with the assumption that accesses will be visible to system software and decryption can happen at the time of copying file pages to the page cache. Unfortunately, making DAX filesystem accesses visible to software defies the purpose of the DAX support. Accordingly, the inventors provide DAX-based filesystems paired with encrypted persistent memory with the ability to do encryption/decryption without sacrificing the direct and OS-transparent access capabilities of the encrypted memory devices.

The method 300 may comprise, at block 302, initializing, by a memory controller, a file identification (FID) field and a file type field in an encryption counter block associated with pages for each file of a plurality of files stored in a byte-addressable persistent memory device (PMD) 150A, in response to a command by an operating system (OS). The file type identifies whether said each file associated with FID field is one of an encrypted file and a memory location. If the file corresponds to a memory location, it is not necessary to query the OTT 112 for a file encryption key, for example.

The method 300 may include, at block 304, decrypting data of a page stored in the byte-addressable PMD, in response to a read command by a requesting core. The processor 101A may be a multi-core processor. The decryption operation may comprise, at block 306, determining if the requested page is an encrypted file or memory location. The method 300 may include, at block 308, if the requested page is an encrypted file, performing decryption based on a file encryption key and a value in the encryption counter block. By way of non-limiting example, the decryption may include performing a first bitwise modular addition of the data of the pages in the encrypted file based on a unique memory encryption/decryption pad generated by a processor encryption key and, subsequently, a second bitwise modular addition of a result of the first bitwise modular addition using a unique file encryption/decryption pad generated by a designated file encryption key associated with the requested file. The encryption and decryption operations may be symmetrical but generally, in reverse of the other.

The method 300 may include tracking, in a current process table (CPT) 114, for each core of a plurality of cores, a current process identification (PID) by corresponding core identification (CID). Additionally, the method 300 may include tracking in an open tunnel table (OTT) 112, for each current PID, an associated FID and file encryption key (FEK). Each PID may open and be associated with a plurality of files. However, these corresponding files may not all be encrypted. However, each encrypted file may have its own file encryption key which may be set by a user, administrator or other means. The OTT 112 allows file encryption keys to be tracked and subsequently changed.

Although blocks/steps are depicted in FIG. 3, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways. Furthermore, managing counter-mode encryption/decryption of secure persistent memory devices may employ both methods of FIGS. 2 and 3 and variations thereof, wherein FIG. 2 serves to recover counter values such as after a system crash or cyberattack.

Figure 4:
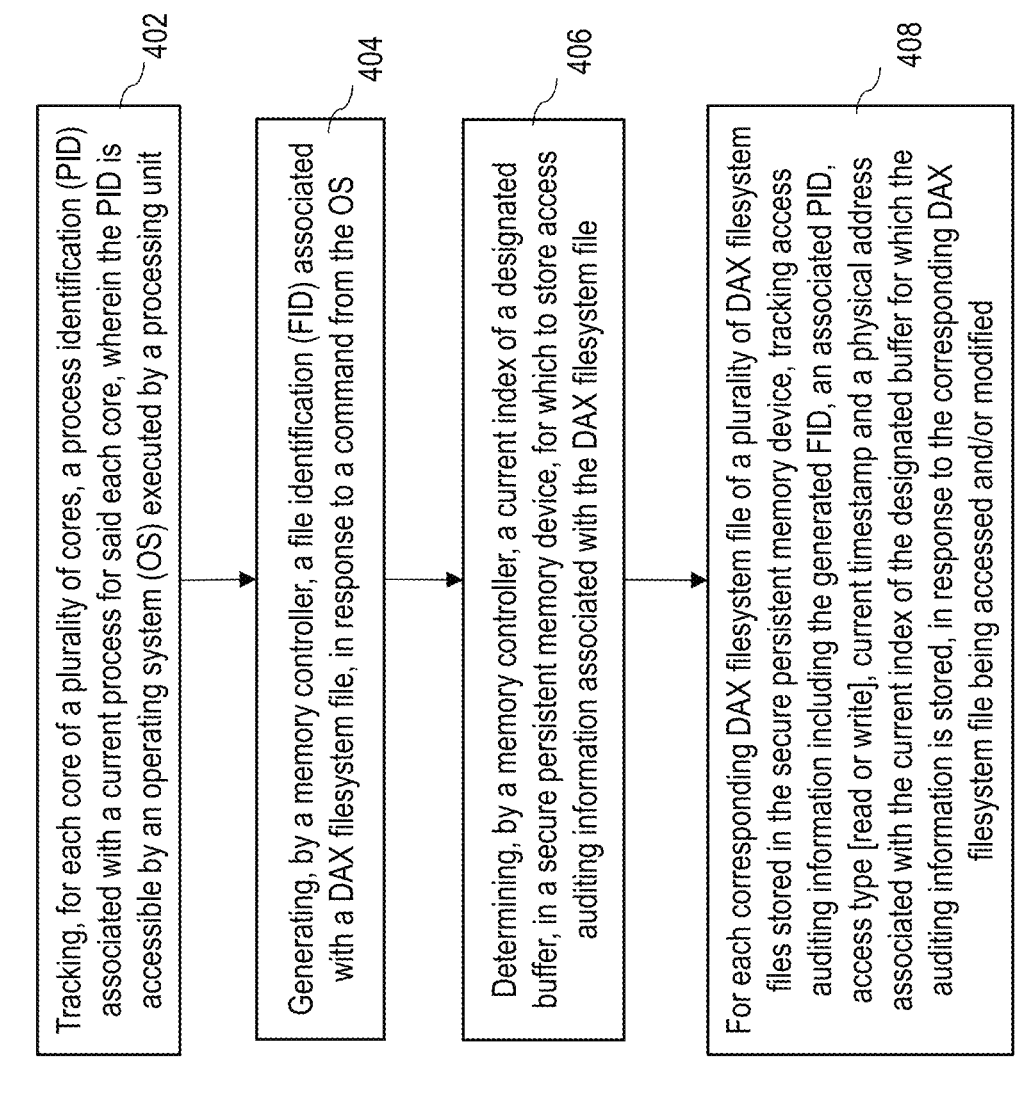
FIG. 4 illustrates a flowchart of a method for managing auditing of files in a secure byte-addressable persistent memory, according to some embodiments.

FIG. 4 illustrates a flowchart of a method 400 for managing auditing of files in a secure byte-addressable persistent memory, according to some embodiments. Similar issues of DAX filesystems mentioned above arise for enabling filesystem auditing. File auditing applications, that track the accesses to files, have been implemented with the assumption that all transactions are visible to software. While the ability to audit file accesses of a DAX filesystem is necessary for security and forensics, it can no longer be available in DAX-based filesystems in encrypted persistent memory devices without hardware support.

Filesystem auditing is a key enabler for improved investigative process visibility, performance optimizations and malware/virus detection. Unfortunately, giving the applications the ability to access files directly through typical memory load/store operations makes implementing filesystem auditing more challenging as most filesystem accesses are no longer visible to OS or system software. Thus, file auditing with or without the need for filesystem encryption/decryption has not been feasible except through impractically interrupting application on each file operation. Accordingly, the inventors provide a DAX filesystem paired with encrypted (secure) persistent memory devices with the ability to perform auditing without sacrificing the direct and OS-transparent access capabilities.

A method 400 may comprise, at block 402, tracking, for each core of a plurality of cores, a process identification (PID) associated with a current process for said each core. The PID is accessible by an operating system (OS) executed by a processing unit. The method may comprise, at block 404, generating, by a memory controller 104, a file identification (FID) associated with a DAX filesystem file in response to a command from the OS 142. The method 400 may comprise, at block 406, determining, by a memory controller 104, a current index of a designated buffer, in an encrypted persistent memory device, for which to store file-access auditing information associated with the DAX filesystem file. For each corresponding DAX filesystem file of a plurality of DAX filesystem files stored in the encrypted (secure) persistent memory device (i.e., persistent memory device 150A), the method 400 may include, at block 408, tracking the file-access auditing information including one or more of the generated FID, an associated PID, access type, current timestamp and a physical address associated with the current index of the designated buffer for which the file-access auditing information is stored, in response to the corresponding DAX filesystem file being accessed and/or modified.

Generally, a plurality of ways may be used to implement filesystem history buffers for file auditing. In one example, a global auditing region may be designated in the memory controller 104 that basically tracks accesses of the DAX filesystem files. This approach is simplistic and requires minimal changes at the OS 142 and memory controller levels. In another example, a per-file auditing region may be used to hold the transactions history of the corresponding DAX filesystem file in the auditing memory array 156 of the encrypted persistent memory device 150A. The auditing implementations are suitable for both encrypted and non-encrypted DAX filesystem files stored in encrypted (secure) persistent memory devices. Furthermore, the auditing implements may incorporate the OTT 112 and CPT 114 described above in relation to FIGS. 1 and 3 for capturing the auditing information. In other implementations, metadata may be generated in lieu of using the information of the OTT 112 and CPT 114.

Although blocks/steps are depicted in FIG. 4, as integral blocks/steps in a particular order for purposes of illustration, in other embodiments, one or more blocks/steps, or portions thereof, are performed in a different order, or overlapping in time, in series or in parallel, or are omitted, or one or more additional blocks/steps are added, or the method is changed in some combination of ways. Furthermore, managing counter-mode encryption/decryption of secure persistent memory devices may employ both methods of FIGS. 2 and 4 and variations thereof, wherein FIG. 2 serves to recover counter values such as after a system crash or cyberattack. Alternately, managing counter-mode encryption/decryption of secure persistent memory devices may employ both methods of FIGS. 3 and 4 and variations thereof, wherein FIG. 3 serves to manage counter-mode encryption of DAX filesystem files. Still further, managing counter-mode encryption/decryption of secure persistent memory devices may employ the methods of FIGS. 2-4 and variations thereof.

Emerging Non-Volatile Memory (NVM) technologies, such as by INTEL and MICRON's 3D XPoint, are promising candidates for building future storage systems. Unlike traditional storage systems, emerging NVM technologies are expected to be offered on a memory-module form factor, thus can be accessed through the memory bus using typical memory load/store operations. Compared to other storage technologies, such as Flash-based drives, emerging NVMs are expected to be orders of magnitude faster, they can endure orders of magnitude more writes and have promising densities. Accordingly, emerging NVMs are expected to revolutionize storage systems and reshape current access to filesystems. To exploit the high-speed of emerging NVM technologies, popular filesystems are beginning to support directly accessing files on NVM. As emerging NVMs can host huge files, the applications can benefit significantly from directly accessing files in small granularity through typical load/store operations. Accordingly, LINUX started to support Direct-Access for Files (DAX) for its EXT4 filesystem, where an application can directly map a file space into its user space then access its data directly through load/store operations. Unlike conventional systems, accesses to DAX-based files do not require invoking software to copy accessed file's page to software-based page cache, but instead they directly access the physical memory through read/write operations to the original file.

Unfortunately, the security aspects of DAX-based filesystems are not well understood yet. For instance, the inventors observe a serious tension between using DAX and encrypting filesystems. While DAX-based filesystems strive to allow the applications to directly access files at small granularity, most filesystem encryption implementations have been implemented with the assumption that accesses will be visible to system software and decryption can happen at the time of copying file pages to the page cache. Unfortunately, making filesystem accesses visible to software defies the purpose of the DAX support. Similar issues arise for enabling filesystem auditing; file auditing applications, that track the accesses to files, have been implemented with the assumption that all transactions are visible to software. While, the ability to audit file accesses is extremely necessary for security and forensics, it can no longer be available in DAX-based filesystems without hardware support. Accordingly, the inventors' embodiments provide DAX-based filesystems with the ability to do encryption/decryption and auditing without sacrificing the direct and OS-transparent access capabilities.

To support directly accessing NVM-resident files without sacrificing the security provided by encryption and auditing, the inventors' embodiments include (1) supporting filesystem encryption for directly-accessible files to enable filesystem encryption through a hardware/software co-design approach. The embodiments may provide trade-offs of combining memory and filesystem encryption engines in encrypted NVM systems. Finally, the embodiments provide optimization techniques that exploit the regular access patterns of files to prefetch files' encryption metadata and data. The inventors' embodiments may further include (2) supporting filesystem auditing techniques for directly-accessible files. The inventors' embodiment provides a high-resolution and flexible auditing scheme. The embodiments tackle a serious issue that can limit the adoption of NVM-based filesystems: the ability to do filesystem encryption and auditing. The embodiments herein enable encryption and auditing efficiently.

While there have been many efforts to enable fast and direct access to NVM-hosted filesystems, the inventors' embodiments address the security impact of using directly-accessible NVM-hosted filesystems. Given the drastically increasing number of cyber threats, securing memory systems has never been as important as it is today.

In the near future, it is expected that the way files are accessed will change radically. Specifically, emerging Non-Volatile Memories (NVMs) are promising candidates for hosting filesystems due to several reasons. First, they are much faster than current storage technologies, such as Flash-based Solid-State Drives (SSDs) and Hard-Disk Drives (HDDs). Second, emerging NVMs can be accessed at much finer granularity than typical storage systems. Moreover, emerging NVMs are expected to be offered in forms that can be attached directly to the memory bus, thus can be accessed with typical load and store operations. In comparison, in current systems, accessing files is typically handled through the software of the filesystem layer then converted into commands that are handled by the software device driver of the storage device, then the obtained data is copied to a memory-hosted software structure called page cache. The software performance overhead, including copying data to page cache, is relatively low when compared to disk access latency, however, this will change in the presence of very fast emerging NVM devices; the software layer overhead becomes a bottleneck. Accordingly, modern implementations of filesystems (e.g., EXT4 in LINUX 4.10+) are beginning to provide support to directly access filesystem's files through load/store operations without the need to copy files' pages to the software page cache. This direct access feature is referred to by Direct-Access for Files (DAX) [1].

Figure 7:
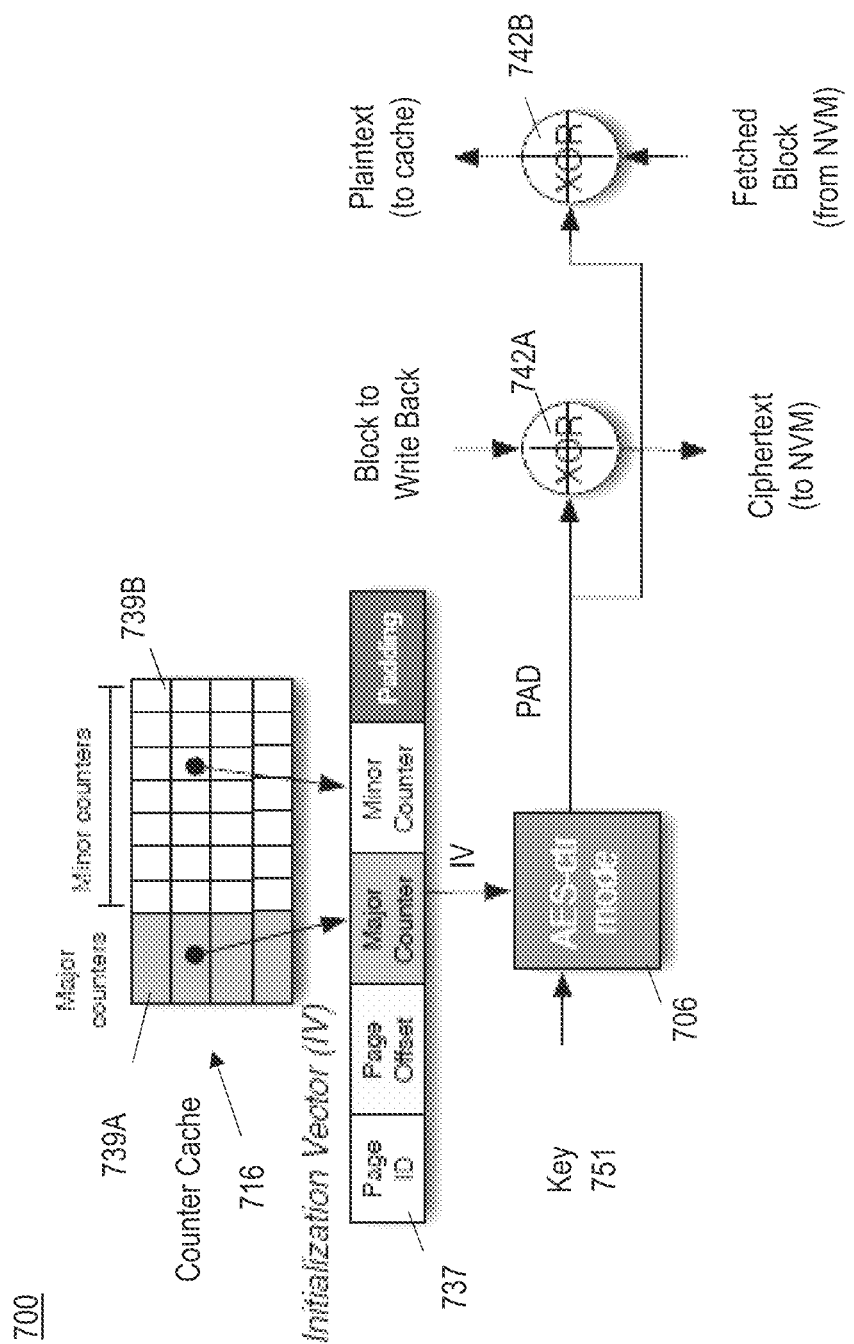
FIG. 7 illustrates a prior art flow diagram of memory encryption using a counter mode.

FIG. 7 illustrates a prior art flow diagram 700 of memory encryption using a counter mode. In counter-mode encryption, the encryption algorithm (Advanced Encryption Standard (AES) or Data Encryption Standard (DES)) uses an initialization vector (IV) having an IV format 737, as its input to the AES engine 706 to generate a one-time pad (OTP) as depicted in FIG. 7. The AES engine 706 receives a key 751 for use in encrypting and generating the one-time pad. Once the data arrives, a simple bitwise XOR either 742A or 742B with the pad is needed to complete the decryption. Thus, the decryption latency is overlapped with the memory access latency. In state-of-the-art designs, each IV consists of a unique ID of a page (to distinguish between swap space and main memory space), page offset (to guarantee different blocks in a page will get different IVs), a per-block minor counter (to make the same value encrypted differently when written again to the same address), and a per-page major counter (to guarantee uniqueness of IV when minor counters overflow). Bitwise XOR 742A provides XORing with the OTP (i.e., pad) and the block to write back to create ciphertext to the NVM. Bitwise XOR 742B provides XORing with the OTP (i.e., pad) and fetched Block from NVM to generate the plaintext to counter cache 716.

The counter mode processor-side encryption is assumed. In addition to hiding the encryption latency when used for memory encryption, it also provides strong security defenses against a wide range of attacks. Specifically, counter-mode encryption prevents snooping attacks, dictionary-based attacks, known-plaintext attacks and replay attacks. Typically, the encryption counters are organized as major counters 739A, shared between cache blocks of the same page, and minor counters 739B that are specific for each cache block. This organization of counters can fit 64 cache blocks' counters in a 64B block, 7-bit minor counters and a 64-bit major counter. The major counter 739A is generally only incremented when one of its relevant minor counter's overflows, in which the minor counters will be reset and the whole page will be re-encrypted using the new major counter for building the IV of each cache block of the page. When the major counter of a page overflows (64-bit counter), the key is changed and the whole memory will be re-encrypted with the new key. This scheme provides a significant reduction of the re-encryption rate and minimizes the storage overhead of encryption counters when compared to other schemes such as a monolithic counter scheme or using independent counters for each cache block. Additionally, a split-counter scheme allows for better exploitation of spatial locality of encryption counters, achieving a higher counter cache hit rate. Similar to state-of-the-art work, a split-counter scheme may be used to organize the encryption counters.

Data integrity is typically verified through a Merkle Tree—a tree of hash values with the root maintained in a secure region. However, encryption counter integrity must also be maintained. As such, state-of-the-art designs combine both data integrity and encryption counter integrity using a single Merkle Tree (Bonsai Merkle Tree).

Figure 8A:
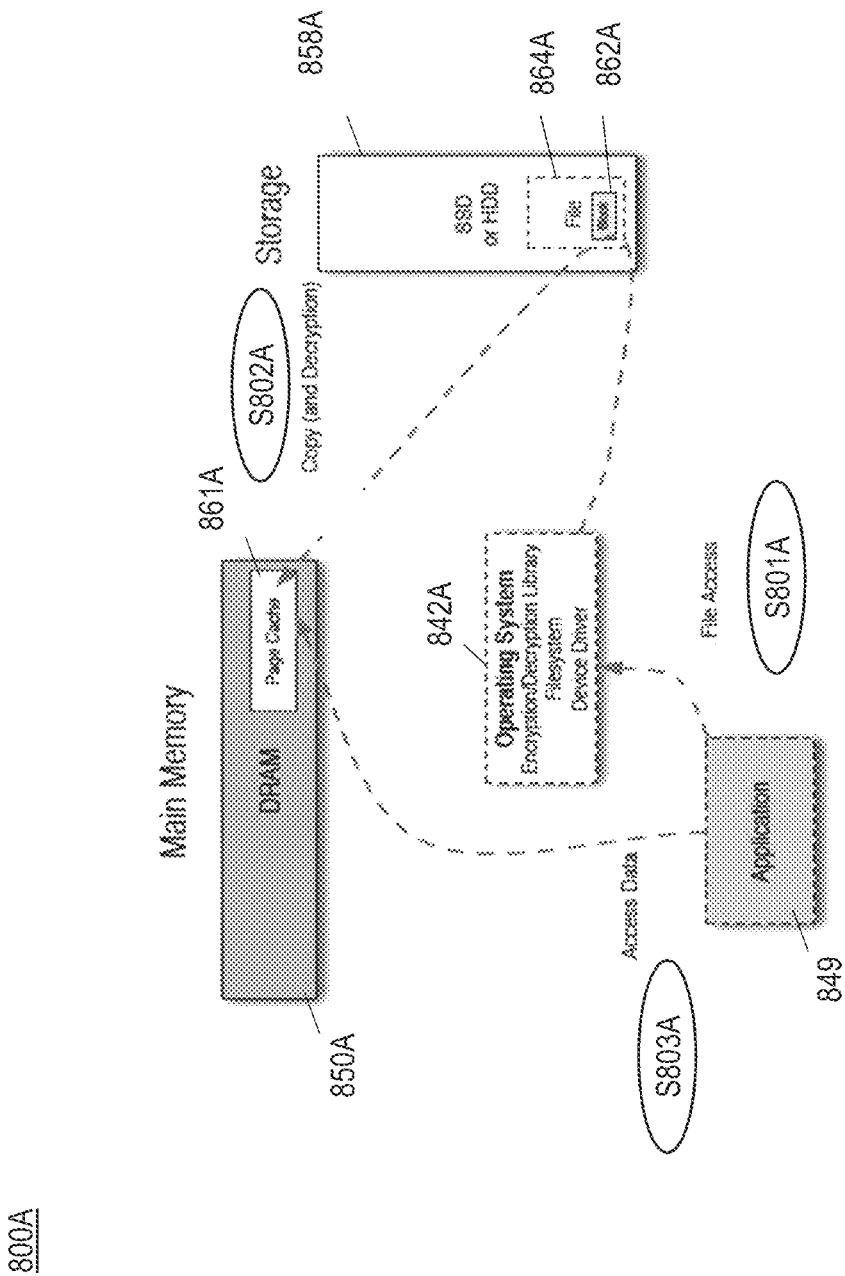
FIG. 8A illustrates a flow diagram of the steps that are typically (prior art) required to access data in a file in conventional systems.

FIG. 8A illustrates a flow diagram of a process 800A of the steps that are typically (prior art) required to access data in a file in conventional systems. To better understand the difference between conventional and DAX-based filesystems, FIG. 8A depicts the steps that are typically required to access data in a file in conventional systems. In Step S801A of process 800A, an application accesses a file's page either through typical system calls or accessing a range of addresses that are mapped to a file (e.g., through mmap) wherein "mmap" maps files through a system call using LINUX or other similar systems. Later, in Step S802A of process 800A, a page fault occurs where the OS 842A will handle the fault by going through multiple software layers, denoted in the block of the OC 842A. The software layers may include device drivers, filesystem and encryption/decryption libraries, for example. The process 800A involves invoking functions from the filesystem layer and the device driver to get the actual data in the file 864A. Finally, the OS 842A copies the page (or block) 862 from the storage device (SSD or HDD) 858 to the page cache 861A in memory 850A, such as a DRAM device. Note that if the file 864A is encrypted, the page will be decrypted after copying it to the page cache 861A. Finally, in Step S803A of process 800A, the application 849 can access the page in the page cache 861A. Since the page cache size is limited, old pages will be evicted (and encrypted) then replaced by new pages. Unfortunately, invoking the OS 842A and copying pages to the page cache 861A is a very expensive process. While the overhead of invoking the OS 842A and copying a page is low when compared to the access latency of HDDs or SSDs, it becomes a bottleneck when fast emerging NVMs are used.

Figure 8B:
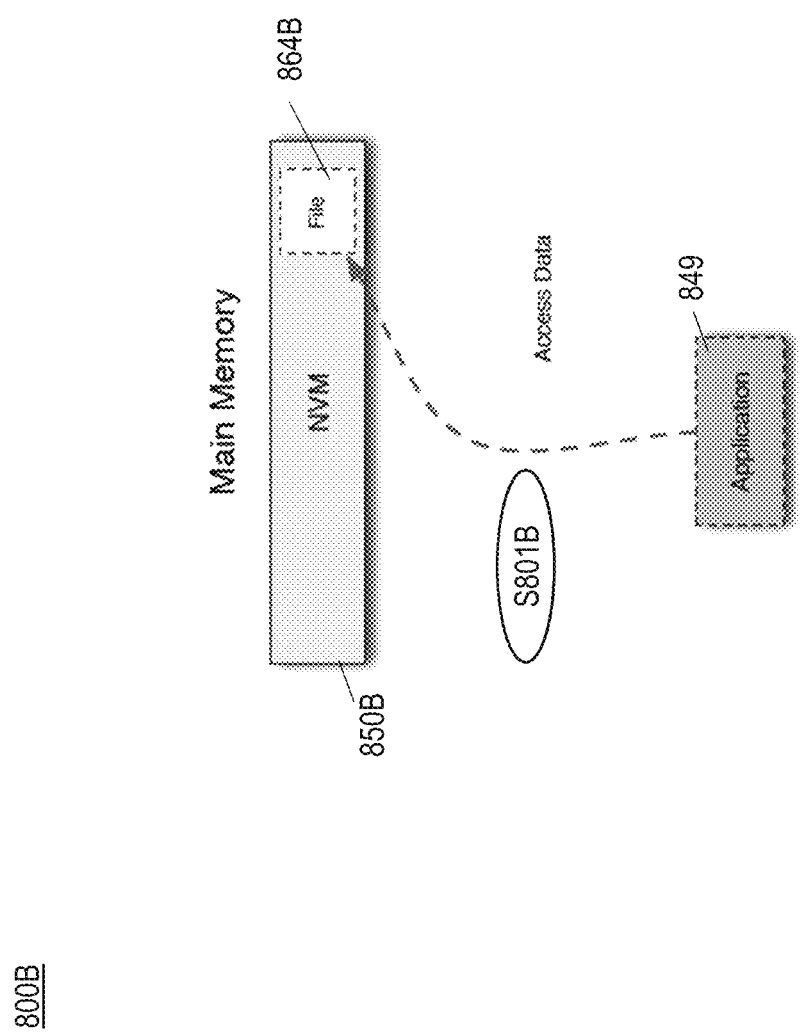
FIG. 8B illustrates a flow diagram of the step to accessing DAX-based files.

FIG. 8B illustrates a flow diagram a process 800B of the Step S801B to accessing DAX-based files. In contrast to the operation of FIG. 8A, in DAX-based systems, after mapping the file into application's address space, the application 849 can directly access the NVM-hosted file through typical load/store operations, as depicted at Step S801B of process 800B in FIG. 8B.

The main purpose of the DAX support is to unleash the performance potentials of emerging NVMs. Bypassing software layers and accessing files directly through typical memory load/store operations can lead to orders of magnitude speedup when compared to conventional approaches. Surprisingly, although DAX is expected to be the default access style for NVM-hosted filesystems, many key filesystem capabilities are challenging to implement in DAX-based systems. Such capabilities have been developed based on the assumption that file accesses are visible to system software. Unfortunately, this is no longer the case in DAX systems; once the application memory-maps a file into its address space, minor page faults occur at the very first access of each page, then subsequent accesses to the mapped pages are no longer visible to filesystem and system software. In other words, filesystem accesses become similar to memory accesses that execute as typical memory load/store operations. Accordingly, the inventors observe that with DAX-based systems, the OS and system software can no longer observe files, thus limiting the ability to track modifications and observe malicious behaviors.

At least two major primitives will be heavily affected by DAX-based NVM filesystems, filesystem encryption and filesystem auditing:

Filesystem Encryption

Encrypting filesystems is one of the main defense-in-depth mechanisms used to ensure minimum leak of information in case of internal or external adversary. Each file can be encrypted with a different key, and each user can have her own set of keys that are derived from her master key. Accordingly, if an adversary somehow gets an access to other users' files, the adversary will not be able to decrypt them correctly. The need for filesystem-level encryption is useful in environments where the files can belong to different users. It becomes useful with different users having different access privileges (e.g., different security clearance levels in government labs) but share the same filesystem. In conventional systems, each time a file page is accessed, the system software decrypts the page then copies it to a small software-managed structure called page cache, which clearly defies the purpose of DAX support: transparency and direct-access. Meanwhile, decrypting the whole file ahead of time is impractical, especially for large files, in addition to increasing the time window for possible attack.

Filesystem Auditing

Filesystem auditing is a key functionality that is no longer easy to implement with DAX-based filesystems. Filesystem auditing has been heavily utilized to monitor filesystem behavior. For instance, LINUX implements an interface, called inotify, that provides mechanisms to monitor filesystem events [2]. Filesystem auditing has been used in optimizations such as physical defragmentation [3], triggering changes synchronization to the cloud [4], enabling virus detection [5], rootkit detection [6] and digital trace evidence on the victim system [7]. Evidently, filesystem auditing is a key enabler for improved investigative process visibility, performance optimizations and malware/virus detection. Unfortunately, giving the applications the ability to access files directly through typical memory load/store operations makes implementing filesystem auditing more challenging; most filesystem accesses are no longer visible to OS or system software; thus, file auditing and encryption/decryption are no longer feasible except through impractically interrupting application on each file operation.

The inventors' embodiments provide capabilities which include critical functions such as the ability of filesystem encryption and filesystem auditing. Both functions are crucial and play major roles in security and digital forensics domains, and they become even more important with the current unprecedented number of cyber-attacks and threats.

In some embodiments, encryption and auditing in directly-accessible filesystems are provided. In some embodiments hardware/software schemes may be used to implement such functions while benefiting from DAX systems and/or allow encrypting and auditing DAX-enabled filesystems with low performance overhead.

In some embodiment, the computing system may include large capacity byte-addressable NVMs, as both storage and memory, and directly attach them to the processor through the memory bus. Based on that, the filesystem encryption embodiments are configured to allow flexible and low-overhead augmentation of major capabilities on directly-accessible filesystems. The embodiments maybe configured to provide encryption and auditing through two separate thrusts.

The first thrust includes supporting filesystem encryption in directly-accessible filesystems. The second thrust includes supporting high-resolution filesystem auditing in directly-accessible filesystems. On each thrust, low-overhead solutions are contemplated.

Threat Model

Figure 9:
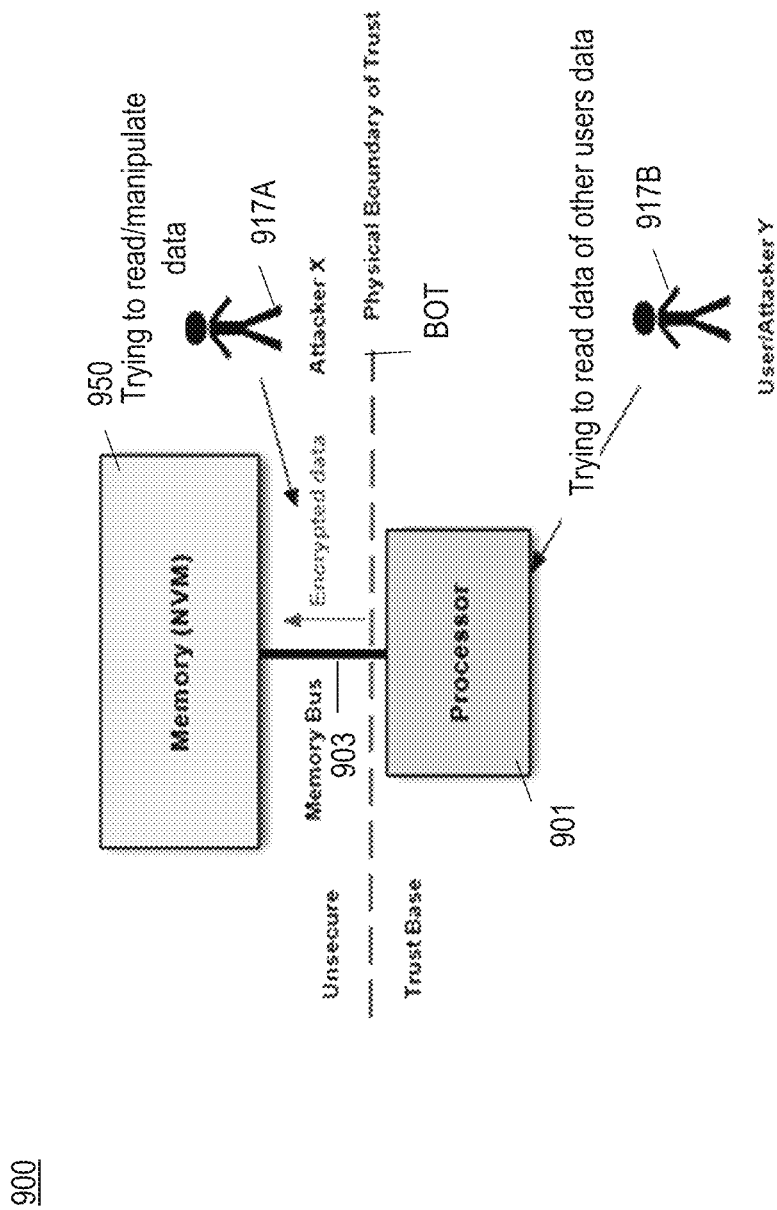
FIG. 9 illustrates a block diagram of a Threat model.

FIG. 9 illustrates a block diagram of a Threat model to a memory system 900. Since the inventors' embodiment involve many security aspects, a threat model will be described first. The threat model is similar to that assumed in state-of-the-art secure memory systems [8, 9, 10, 11], however, the inventors also account for internal threats that are common in multi-user environments (e.g., HPC and cloud computing).

As shown in FIG. 9, an attacker (Attacker X) 917A can potentially obtain the physical memory and scan through it for passwords and other confidential data. The attacker 917A can also snoop the data communicated between the processor 901 and the NVM memory 950 via memory bus 903, to learn confidential information. Moreover, external attackers can directly read or tamper with memory contents. In contrast, another attack type could result from an internal user of the system 900, Attacker Y 917B trying to access other users' data either through obtaining access permissions from an administrator or using other avenues to access other's files (e.g., illegally modifying the filesystem metadata). It is also possible that the attackers are the system administrators themselves. Conventional systems with secure NVM-based main memories 950 only encrypt the data before leaving the processor boundaries, such as a physical boundary of trust (BOT) and decrypt the data when reading back from the memory 950.

As shown in FIG. 9, such a protection combined with data integrity verification mechanisms can prevent most of the attacks that can occur due to physical access to the system by an attacker. Unfortunately, this is insufficient to protect users' data from other users or administrators of the system; the data will be decrypted once it arrives to the processor chip boundaries, thus other internal users can see the data unencrypted. Analogous to the need for filesystem-level encryption in addition to NVM memory encryption, Full-Disk Encryption (FDE) has been used for years to protect systems from external attacks; however, filesystem-level encryption has been additionally deployed to prevent accessing confidential data by other users.

Memory Encryption

There are two general approaches for encrypting NVM. One approach assumes the processor is not modified, and the NVM controller encrypts the main memory content transparently to the processor [8]. To minimize performance overheads, cold data (i.e., infrequently used data) stays encrypted, but hot data is proactively decrypted and stored in plaintext in memory. Another approach assumes that the processor can be modified, and the processor chip is the secure base. Any data sent off chip in the main memory is encrypted. There are many example systems using the latter approach, including some recent studies [12, 13, 9].

There are several encryption modes that can be used to encrypt the main memory. One mode is direct encryption (also known as electronic code book or ECB mode), where an encryption algorithm such as AES is used to encrypt each cache block as it is written back to memory and decrypt the block when it enters the processor chip again. Direct encryption reduces system performance by adding decryption latency to the last level cache (LLC) miss latency. Another mode is counter mode encryption, where the encryption algorithm is applied to an initialization vector (IV) 737 to generate a one-time pad. This is illustrated in FIG. 7. Data is then encrypted and decrypted via a simple bitwise XOR via XORs 742A and 742B with the pad. With counter mode, decryption latency is overlapped with LLC miss latency, and only the XOR latency is added to the critical path of LLC miss. In state-of-the-art design, the IV of a counter mode encryption consists of a unique ID of a page (similar to a page address, but is unique across the main memory and swap space in the disk), page offset (to distinguish blocks in a page), a per-block minor counter (to distinguish different versions of the data value of a block over time), and a per-page major counter (to avoid overflow in counter values).

For the sake of discussion assume a counter mode processor-side encryption, similar to prior work [12, 13, 9], because counter mode is more secure. Encryption in ECB mode, without the use of counters or IVs is vulnerable to several attacks based on the fact that identical blocks of plaintext will encrypt to identical blocks of ciphertext, wherever they occur in memory; vulnerabilities include dictionary and replay attacks. Memory-side encryption (e.g., with secure DIMMs) is vulnerable to bus snooping attacks. In addition, processor-side encryption makes it easier to interface with the OS, use per-user and per-application keys, and expose key management to users and applications (where appropriate). DIMM means dual in-line memory module, which is a module that has one or more random access memory chips on a circuit board that can be attached to the motherboard through pins.

Counters are kept in the main memory but are also cached on chip with one major counter of a page co-located in a block together with all minor counters of a page. For example, in [13], a 4 KB page has a 64-bit major counter that is co-located with 64 7-bit minor counters in a 64-byte block. Any parts of the IV are not secret and only the key is secret. The security of counter mode depends on the pad not being reused, hence at every write back, a block's minor counter is incremented prior to producing a new IV to generate a new pad. When a minor counter overflows, the major counter of the page is incremented, and the page is re-encrypted [13]. Finally, counter mode integrity needs to be ensured to avoid attackers from breaking the encryption. While counters are not secret, they are protected by Merkle Tree to detect any tampering to their values [12].

Filesystem (FS) Encryption

Encrypting filesystems have been explored heavily in the past. Several implementations of cryptographic filesystems have been proposed, examples are CFS [14], Cryptfs [15], eCryptfs [16] and TCFS [17]. In contrast, all these implementations are software-based. While software-based decryption overhead could be marginal when accessing SSDs or HDDs, the overhead can be dominant for directly accessible files in fast NVM-based systems. Note that software-level encryption and decryption can be implemented at different layers in the system; however, explicit software-based encryption/decryption is required.

One related focus direction is Full-Disk Encryption (FDE) [18, 19] and its counterpart memory encryption [11, 8, 10, 9]. The focus is on hardware encryption of the whole storage or memory regardless of its semantic. Typically, FDE is used transparently and executed inside the SSD or HDD; however, it provides a much coarser granularity than filesystem-level encryption. Most importantly, filesystem-level encryption provides protection from internal users trying to access other users' files.

Note that many systems deploy both FDE and filesystem-level encryption to protect against different types of attacks. Although some protection levels are duplicated, this is typically recommended as a layering tactic, conceived by the U.S. National Security Agency (NSA), called defense-in-depth [20].

INTEL has recently released a system library called INTEL Protected File System (FS) Library [21]. The application has to use INTEL Safe Guard Extension (SGX) enclaves [22], which requires modifying the source code, in addition to accessing two levels of libraries for each file access: SGX Protected FS trusted library then the SGX Protected FS untrusted library. While the details of the encryption/decryption functionalities implementation are not publicly available, the current implementation assume that each file access will be visible to the software, hence going through the SGX protected libraries. Unfortunately, this is not the case for directly-accessible NVM-based filesystems, especially with the presence of DAX support that enables direct access to the files through load and store instructions [1].

Filesystem (FS) Auditing

Filesystem auditing is a key functionality that is no longer easy to implement with DAX-based filesystems. Filesystem auditing has been heavily utilized to monitor filesystem behavior. For instance, LINUX provides API called inotify which provides mechanisms to monitor filesystem events [2]. Filesystem auditing has been used in optimizations such as physical defragmentation [3], triggering changes synchronization to the cloud [4], enabling virus detection [5], rootkit detection [6] and digital trace evidence on the victim system [7]. Evidently, filesystem auditing is a key enabler for improved investigative process visibility, performance optimizations and malware/virus detection. Unfortunately, with giving the applications the ability to access files directly through typical memory load/store operations, implementing filesystem auditing becomes more challenging; most filesystem accesses are no longer visible to OS or system software, thus file auditing and encryption/decryption are no longer feasible except through impractically interrupting application on each file operation.

Motivation

To quantify the overhead of decrypting data through software, the inventors may use LINUX's PMEM emulation driver and DAX supported filesystem to memory-map a file so it can be directly accessed in memory. Later, the inventors run an application that continuously accesses the data of the file with a random pattern. Since NVMs are most promising for accessing files in small granularities, e.g., 64B or even smaller, the inventors vary the access granularity to the file. After each access, INTEL's AES-NI instructions are used to decrypt the accessed data wherein AES-NI stands for Advanced Encryption Standard New Instructions.

Figure 10:
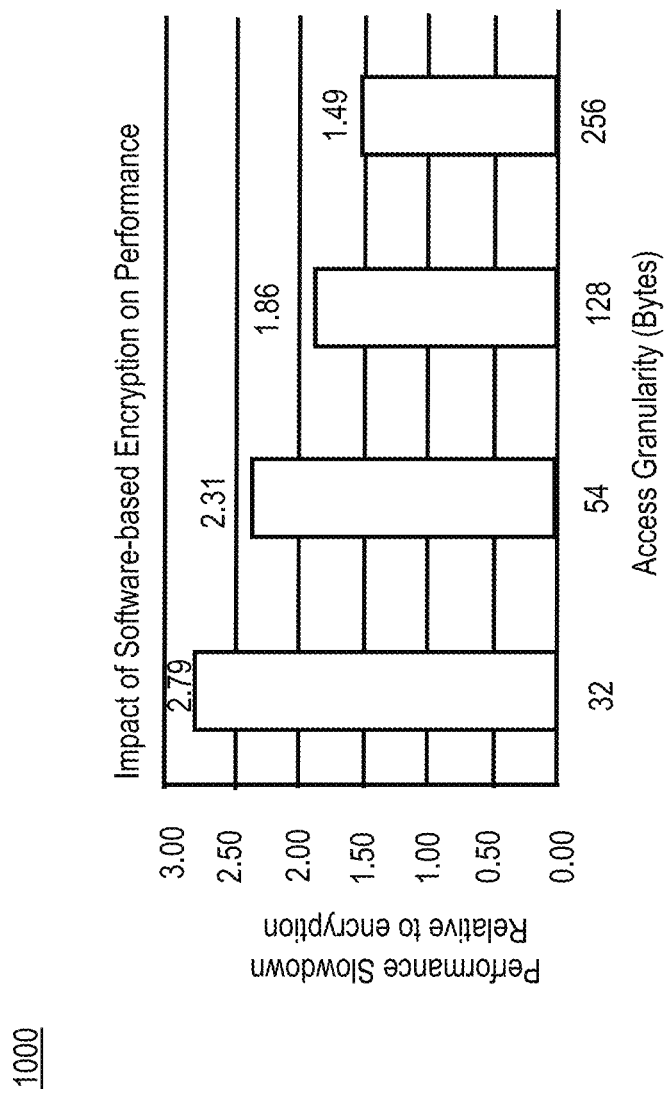
FIG. 10 illustrates a graphical representation of the slowdown of each access granularity for software-based decryption compared to the same run without encryption.

FIG. 10 illustrates a graphical representation 1000 of the slowdown of each access granularity for software-based decryption compared to the same run without encryption. From FIG. 10, it is observed that the encryption overhead increases significantly when accessing the data with small granularity, because the encryption overhead decreases for longer access due to the pipelined implementation of INTEL's AES-NI instructions. For instance, a slowdown of approximately 2.79× for accessing data with 32-byte granularity is observed. Such significant overhead renders accessing the file data with fine granularity less attractive. In fact, one promising advantage of using emerging NVMs is the ability of quickly accessing files' data with Small granularity [26, 27, 28, 29, 30]. Database systems, key-value store applications and data analytics are examples of applications that will significantly benefit from fast fine-granularity accesses to huge files. For instance, some studies showed that NVM-based filesystems perform best at granularities as small as 8 bytes [27].

The embodiments may be divided into two main thrusts. The first thrust includes supporting filesystem encryption/decryption for DAX-based files. The second thrust includes supporting filesystem auditing for DAX-based files.

Thrust 1: Supporting Filesystem Encryption/Decryption in DAX-Based Filesystems

Thrust 1 may be have a directly-accessible and encrypted filesystems through hardware/software (HW/SW) Co-Design configuration.

As mentioned, conventional systems with secure NVMs use a single processor key for encrypting cache blocks when writing them to memory and decrypting them when reading back the blocks. In contrast, in encrypted filesystems, each file might be using a specific key. In systems where NVMs are used as both memory and storage, the embodiments herein will clearly differentiate between files' cache blocks and memory cache blocks. One promising approach to abstract both systems (storage and memory) into a unified scheme is to expose the memory controller to the type (memory or file) of the requests cache blocks. For simplicity, assume each file has a unique FileID that is set by the OS, however, anonymous (memory) pages has a special FileID value (e.g., 0). When the processor reads/writes a cache block, it needs to know its corresponding FileID, which is 0 if memory or the ID of the file if part of a file. Finally, if it is a memory block (i.e., FileID is 0), then the memory controller uses processor key, otherwise the processor uses the file-specific key (if encrypted) in addition to encrypting/decrypting it again using the processor key.

Figure 11:
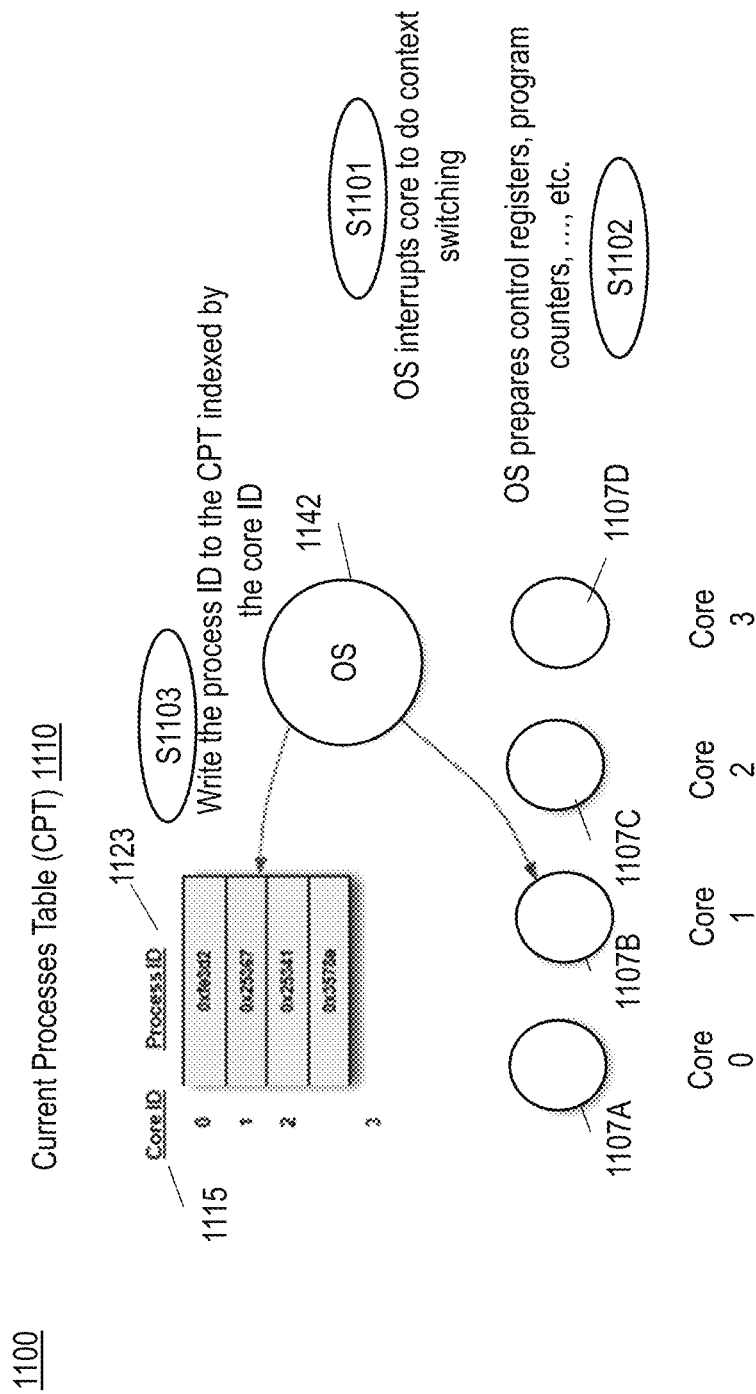
FIG. 11 illustrates a flow diagram of a process for setting up a Current Processes Table (CPT)

FIG. 11 illustrates a flow diagram of a process 1100 for setting up a Current Processes Table (CPT) 1110. For security reasons, the process 1100 can use only the file key it has provided to the memory controller, otherwise other processes can access the decrypted blocks whenever there is a correct key provided to the memory controller by an authorized process. Accordingly, the embodiments herein keep track of the ID of each process being executed in each core. The embodiments of the inventors call the Process ID tracking table Current Processes Table (CPT) 1110. CPT 1110 can be thought of as a memory-addressable structure, however, only accessible through the OS 1142. Each row in CPT 1110 has a unique address and represents a specific core, such as core 0 1107A, core 1 1107B, core 2 1107C and core 3 1107D. The contents of the CPT rows are the IDs of the processes executing on each core, denoted as Process ID 1123 and core ID 1115. Note that at any instance of time, there is only one process executing in any logical core. The content of CPT 1110 is only updated at the time of context switch (i.e., the process of scheduling another process to run on the core). In the typical context-switching process at Step S1101 of process 1100, the OS 1142 is invoked either through timer interrupt or fault. Typically, the context-switching occurs a few times per millisecond. The OS 1142, at Step S1102 of process 1100, sets up the control registers appropriately, e.g., the root of the page table for the process in CR3 register, then starts executing the process on the switched core wherein at Step S1103 of process 1100, the Process ID 1123 is written to the CPT indexed by the core ID 1115. The CR3 register is useful for tracking which process is being executed. As shown in FIG. 11, the OS 1142 may set the corresponding CPT entry with the Process ID 1123 of the newly scheduled process. The CPT structure is physically located near the memory controller.

Figure 12:
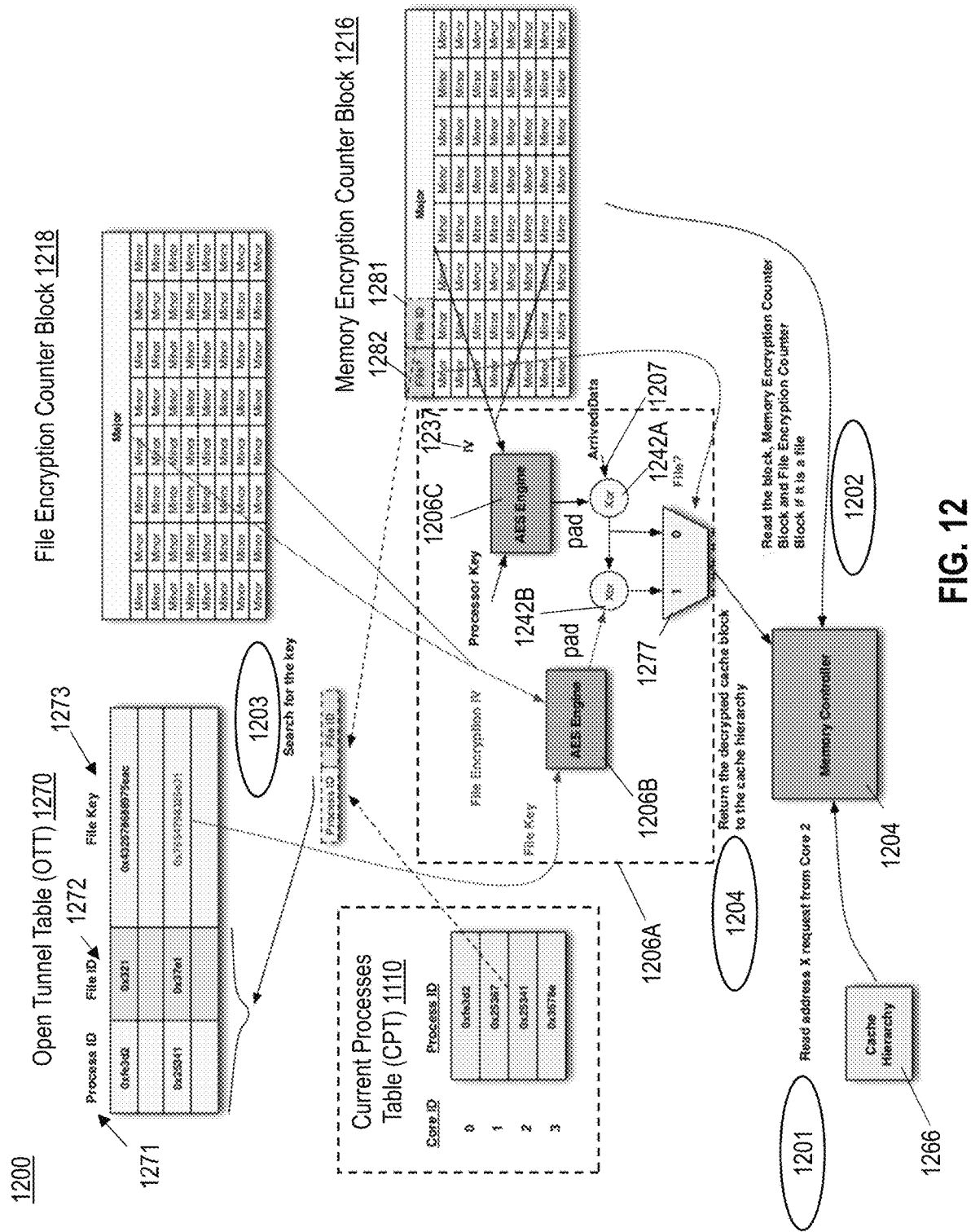
FIG. 12 illustrates a flow diagram of a process for hardware-based filesystem encryption for a read request of a cacheline in a page of an encrypted file.

In typical filesystem encryption schemes, the LINUX does a process of keying the password of the process internally[31]. Thus, any later access to the file from the same process does not require the user or process to enter the password again, but the LINUX kernel uses the cached password to decrypt the accessed page through software. In contrast, the inventors' embodiments keep the provided password or file encryption in a hardware structure called Open Tunnel Table (OTT) 1270 (FIG. 12). The OTT 1270 is only updated through the kernel when a process opens a file and provides its password or encryption key. The OTT structure, as shown in FIG. 12, is also located near the memory controller 1204 and only accessible by the OS kernel. The memory controller 1204 can access any entry in the OTT 1270 through providing the Process ID 1271 and the FileID 1272. The FileID 1272 is a unique ID given to each file by the OS. In typical systems, the first access to a page causes a minor page fault where the OS sets the virtual to physical mapping and updates the page table. In case of a memory-mapped file, the OS finds the corresponding physical page address and maps the virtual address to that physical address.

Now the question is how can the memory controller 1204 know the FileID of the requested (to be read or written) cache block. Fortunately, in actual encrypted memory processors, e.g., INTEL's SGX [32, 33] and AMD's SME [34], a per-block memory encryption metadata, e.g., initialization vectors (IVs), are retrieved before completing the request. This has been also widely assumed in secure memory academic papers [9, 10]. Accordingly, the inventors' embodiments use some parts of this metadata to encode the FileID value. To do this, the OS sends the memory controller 1204 a command to initialize the File? in File? field 1282 and FileID in FileID field 1281 in the corresponding memory encryption counter block, as shown in FIG. 12. The File? field 1282 is a bit that is set only if that physical page belongs to an encrypted file, whereas the FileID field 1281 is used to store the FileID of the file that page belongs to. As used herein FileID and FileID field use the same reference numeral. Furthermore, File? and File? field use the same reference numeral. Similar to memory encryption, the inventors' embodiments also associate each physical page with a file encryption counter block (64-byte) that holds the counters used to establish the file encryption IVs to encrypt/decrypt the pages of the file, which is denoted by File Encryption Counter Blocks. The OTT 1270 also includes a column for File Keys 1273 wherein each File ID 1272 in the OTT 1270 has its own file key.

FIG. 12 illustrates a flow diagram of a process 1200 for hardware-based filesystem encryption for a read request of a cacheline in a page of an encrypted file. In Step S1201 of process 1200, the memory controller 1204 receives a read request originated from a core, such as Core 2 in the illustrated example. Later, in Step S1202 of the process 1200, the memory controller 1204 submits a read request to the memory (not shown in view) and concurrently reads the counter blocks (i.e., the memory encryption counter block 1216 and file encryption counter blocks 1218. Note that since the counter cache can exploit the page spatial and temporal reuse of counters, it is very likely that the counters blocks exist in the counter cache (i.e., counter block cache 116), thus the IVs 1237 will be ready before the encrypted file data arrives, at line 1207. It is also important to note that there is no need to obtain the file encryption counter block if the page does not belong to a file; however, it is possible to fetch both encryption counter blocks (memory and file counters) at the same time. The flow diagram to generate the encryption/decryption pad, by engine 1206B, for the file encryptions in dashed block 1206A, which is a dual encryption process for both the memory and file. The file key by the dual encryption process 1206A is looked up (searched for) in the OTT 1270 using the Process ID of the requesting core from CPT 1110 and the FileID field 1281 in the memory encryption counter block 1216, as shown in Step S1203 of process 1200. Finally, in Step S1204 of process 1200, the generated processor encryption pad from engine 1206C is XORed by XOR 1242A with the encrypted file data and XORed by XOR 1242B again with file encryption pad from engine 1206B (if it belongs to a file), and the result of the XORs 1242A and 1242B is selected via selector 1277 to produce a decrypted result based on the received data paths. The decrypted result is returned through the memory controller 1204 to the processor 101A or 101B. The File? data is used to indicate to the selector 1277 if the corresponding data block belongs to a file or not, and thus add the second encryption/decryption via the selector 1277. In some embodiments, the selector 1277 may be a multiplexer.

The memory encryption IVs from the memory encryption counter block 1216 is similar to the generation of the IVs as set forth in FIG. 7. Likewise, the file encryption IVs from the file encryption counter block 1218 is similar to the generation of IVs as set forth in FIG. 7.

Guarding Data while in Shared Domains

One potential attack avenue for a near memory-controller encryption/decryption implementation is accessing decrypted data through the coherency domain. Unlike data fetched from memory, where the memory controller has to decrypt the data with the corresponding key, accessing data that currently exist on the cache hierarchy can directly expose the plaintext, even for unauthorized users. For instance, any process that has its virtual addresses mapped to the unauthorized file can read its data directly while decrypted in the cache hierarchy. Accordingly, to close such avenues the inventors' embodiments opt for using uncacheable file data strategy, where the data goes directly to the requesting core. Such a solution is also important for preventing illegitimate write attempts; any updates to the file data will be written directly to the memory, where the memory controller can check if the core submitting the write request has a legitimate tunnel. Allowing files to be cached can potentially add significant complexity and render filesystem encryption impractical; if a dirty block in the last-level cache (LLC) gets evicted and sent to be written back to memory, there may be a mechanism to know which process has written that block, which could be potentially not running on any core at the time of eviction. Furthermore, it is common that files and big data applications do not benefit much from the cache hierarchy 1266. Finally, similar to conventional persistent applications, updates to persistent files persist through persistence barriers or direct flushes to the memory controller (e.g., INTEL's clwb and sfence instructions). Since the file data is uncacheable, the embodiments only need a barrier, such as sfence, to make the data visible to the memory controller by flushing the small caches (Write-Combine Buffers) typically used to buffer/cache uncacheable data. In some embodiments, additionally, the approaches herein may to tackle coherency domain access vulnerabilities, such as enforcing the same Address Space Identifiers (ASID) in coherency implementations, inspired by AMD's SVE and SME technologies [34].

Extensibility to Other Encryption Techniques

Any encryption technique can be implemented with the embodiments herein given that 1) the encryption algorithm, e.g., DES or AES, is supported in the memory controller logic, or reconfigurable logic exists in memory controller; and 2) there is a way for the memory controller to know the FileID of each cache line. While for the counter-mode encryption, the embodiments herein may repurpose the counter blocks to include FileID, direct-encryption (less secure) schemes need memory-resident metadata per cacheline to provide FileID information, hence the key to be selected from OTT.

Security Discussion

Different schemes to prevent attacks may be used. If unauthorized users obtain access permissions for a file, during the process of opening the file by their applications, the OS asks them to provide their password or decryption key of the file. If the decryption key provided was wrong, the file encryption IV will be encrypted with a wrong value, thus the data will be decrypted incorrectly and provide nothing but meaningless information for the unauthorized user. The embodiments can also incorporate mechanisms for timely security alerts. At the time of opening a file, the OS also sends the location of a fixed magic number stored with the file and known for the OS. Later, the memory controller tries to use the decryption key provided by the user to decrypt that magic number and compare it with what it expects. If a mismatch occurs, the memory controller interrupts the system and invokes an unauthorized access attempt warning. Note that, in the embodiments herein, the OS does not need to store or keep track of the encryption keys, but only the value expected of that magic number, which can be a fixed value similar across all files. Such alerting mechanisms can potentially protect systems from attacks, such as ransomwares, in which an unauthorized user overwrites the file encrypted with a different key. The system of the inventors' embodiments may quickly detect such attempts of reading or writing files by an unauthorized user who lacks the correct credentials. In one of the worst attacks, the processor key gets compromised, the encrypted files in the memory system are still unintelligible for external attackers; decrypting the file content through the processor key is insufficient due to the file-level encryption, yet they are protected against chosen-plaintext attacks, replay attacks and dictionary-based attacks.

The embodiments herein may enable encrypting byte-addressable filesystems. While prior work investigated memory encryption [9, 10, 8], the inventors' embodiments brings in a new important direction: filesystem encryption in byte-addressable NVMs to support filesystem encryption in secure NVMs. If memory encryption is not used by default, the inventors' filesystem encryption scheme can still be used. The inventors' embodiments differ from NVM memory encryption in that it requires more information from OS, such as: setting FileIDs, tunnel table and current processes table.

In some embodiments, the system may enable file portability and changing the encryption keys. The embodiments may include key management, flexibility of choosing encryption algorithm, limitations of the number of active tunnels the scheme can handle, the need for extra data and counter integrity verification mechanisms beyond the conventional memory integrity verification mechanisms, and finally the impact on the power and performance of the system.

Optimizing Filesystem Encryption in Encrypted NVMs

As discussed earlier, to start the encryption/decryption process, the IV is to be established using the major and minor counters. Accordingly, a sparse access pattern can result in almost twice the memory bandwidth; bringing each cacheline from memory will also require bringing the memory encryption counters block for that cacheline. Unfortunately, hardware-based filesystem encryption can even exacerbate such overhead. Now each time, reading a cache block that belongs to a file occurs, two cache blocks are brought to the memory controller: the memory encryption counters block and the file encryption counters blocks. Thus, the memory bandwidth requirement becomes 3× the unsecure system. Furthermore, duplicate encryption and decryption will be needed for blocks that belong to an encrypted file (see FIG. 12). While this might be negligible for applications that are not memory-intensive, it can significantly degrade the performance for memory bandwidth limited applications. Accordingly, it is important to optimize the memory bandwidth requirements for secure designs. The thrust of some embodiments may be to reduce the bandwidth overhead of hardware-based filesystem encryption to be similar to the base secure NVM designs. Furthermore, some embodiments may reduce the performance overhead.

Repurposing Memory Encryption Counters for Filesystem Encryption

Figure 13:
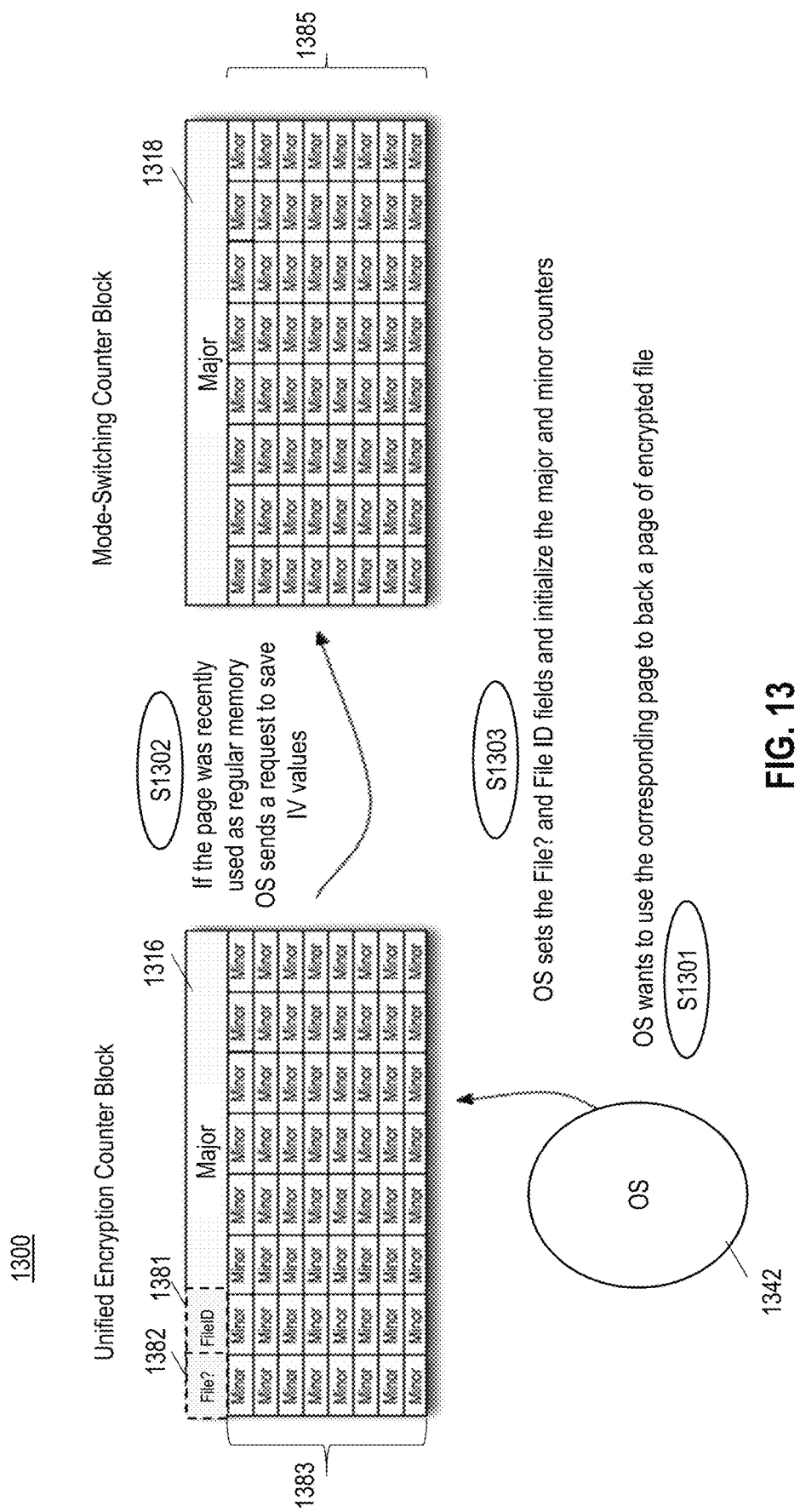
FIG. 13 illustrates a flow diagram of a process using unified encryption counter block and mode-switching counter block for a unified memory system using memory and hardware-based filesystem encryption.

FIG. 13 illustrates a flow diagram of a process 1300 using unified encryption counter block 1316 and mode-switching counter block 1318 for a unified memory system using memory and hardware-based filesystem encryption. In some embodiments, a first approach towards bandwidth overhead minimization is through merging storage and memory encryption into one scheme. Accordingly, if the requested address is a cache block that belongs to a file, only a single counter block is required to do the encryption/decryption. For each page there are now two metadata blocks, a unified encryption counter block 1316 and mode-switching counter block 1318, as shown in FIG. 13.

When a memory request is submitted to the memory controller, the unified encryption counter block 1316 is fetched. If the File? Field 1382 is set, then it is a file with the FileID 1382 stored in the corresponding field, otherwise it is a typical memory block, or it belongs to an unencrypted file. However, as mentioned earlier, it is very important that the same IV is not reused to encrypt the same cache block. It is possible that the same page currently used as a file will be later used as typical memory, thus it is important to keep track of the most recent IVs (i.e., counters) used with the processor key. To achieve that, the embodiments use the mode-switching counter block 1318 to store the counters' state of the previous mode (memory or file). Later, as shown in Step S1301 of process 1300, when a memory page is freed and allocated by the OS 1342 as a file page, the OS 1342 sends a request to the memory controller to copy the current counters in the unified encryption counters block 1316 to the mode-switching counter block 1318, as shown in Step S1302 of process 1300. The unified encryption counters block 1316 is a major block with minor blocks 1383. The mode-switching counter block 1318 is a major block with minor blocks 1385.

Finally, as shown in Step S1303 of process 1300, the OS 1342 initializes the unified encryption counter block 1316. Note that in case of page mode change of memory-to-memory, file-to-file or file-to-memory, Step S1302 of process 1300 should not be executed. Note that in case of file-to-memory page mode change, an extra step is needed; the mode-switching counter block 1318 needs to be copied to the unified encryption counter block, so it is used to establish the IVs for encryption/decryption. Note that reading the mode-switching counter block 1318 is only needed at the time of page mode switching, a relatively infrequent operation, whereas the default implementation requires reading two counter blocks (the file and memory).

Exploiting Filesystem Encryption Metadata for Prefetching

It is important to note that accessing a file typically occurs with regular patterns (easy to predict). Accordingly, the memory controller can prefetch the counter blocks of the next page or fixed-distance away page. Such counter blocks prefetching mechanisms can use the File? and FileID fields to distinguish between the access patterns of different files and issue more accurate prefetching requests.

Security Discussion

If the file encryption key is revealed, an external attacker can use to decrypt the file data, because the file data is no longer double encrypted with the processor key. However, only the data of the file whose key was revealed can be decrypted by the attacker. Accordingly, the inventors have determined that there is a performance-security trade-off that can be chosen by the system designers or integrator. Note that this performance optimized scheme can be enabled/disabled when using the baseline scheme.

The embodiments herein may reduce the overheads result from encryption duplication. The embodiments may employ a prefetching scheme that employs the ability to distinguish file accesses to improve prefetching accuracy.

Accordingly, performance optimizations for the hardware-based filesystem encryption scheme herein may be employed to impact security and identify performance-security-flexibility trade-offs for different deduplication schemes. Furthermore, counters and data prefetching algorithms that can be employed to take advantage of the ability of identifying the FileID of the accesses to achieve more accurate prefetching mechanisms.

Thrust 2: Enabling High-Resolution Filesystem Auditing

Some embodiments herein augment DAX-based filesystems with the ability to audit files.

OS-Defined Fixed-Size History Buffer

In some embodiments, filesystem auditing may be enabled through simple software and hardware changes to allow tracking the last N transactions of a specific file. To support this, the OS needs to allocate auditing region in the memory that gets updated by the memory controller on each access to the file. Since the auditing region is small in size and thus can quickly get filled, the auditing region can be implemented as a circular buffer. Furthermore, the memory controller needs a mechanism to find out the current index of the circular buffer, the size of the circular buffer and the starting physical address of that physical buffer.

Generally speaking, there could be two ways to implement filesystem history buffers. First, a global auditing region that basically tracks accesses for all files. An advantage of this approach is the simplicity and minimal changes required at the OS and memory controller levels. Second, a per-file auditing region which holds the transactions history of the corresponding file.

Global Auditing Region

Figure 14:
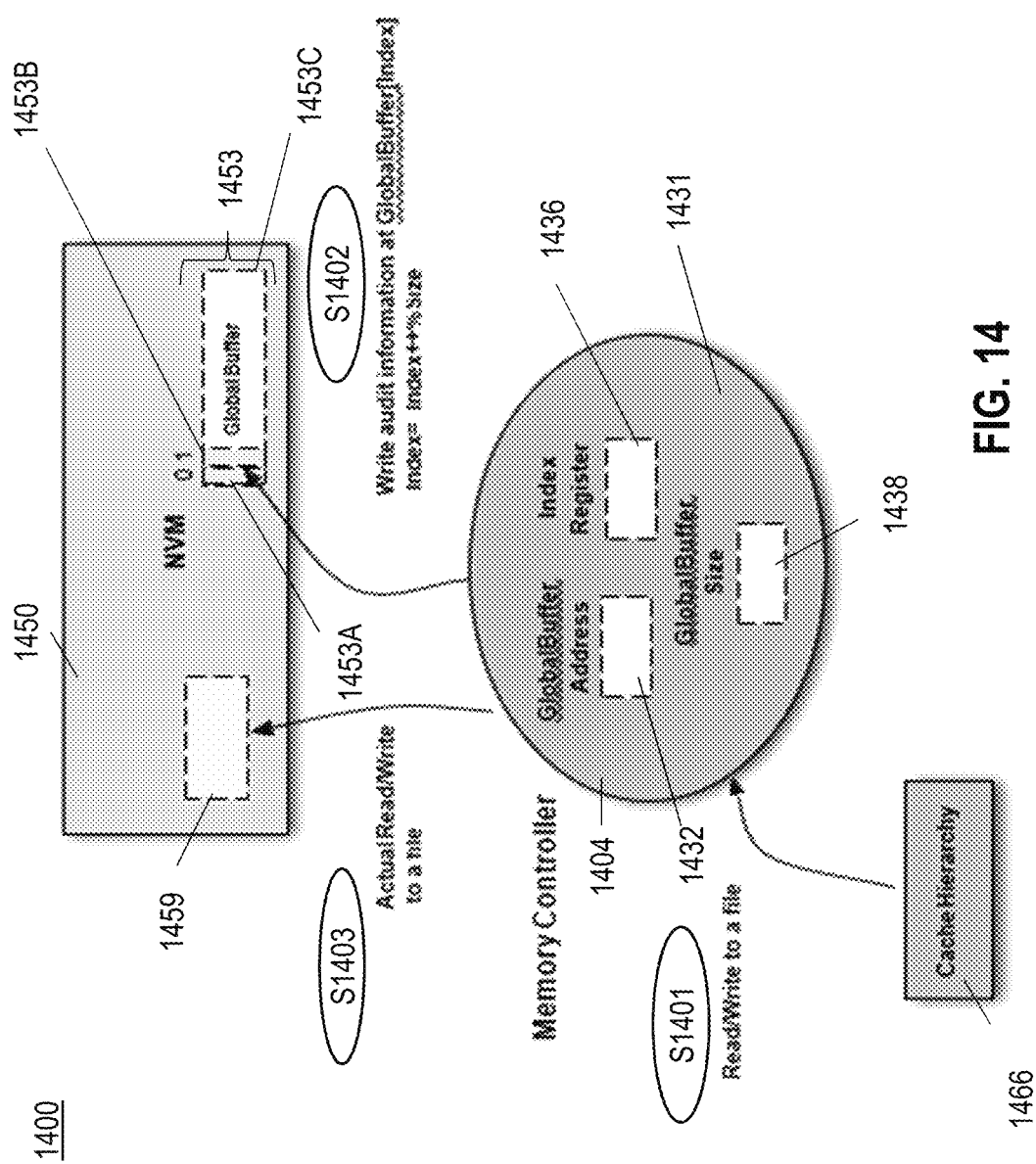
FIG. 14 illustrates a flow diagram of a process for auditing using a GlobalBuffer auditing region in the memory system.

FIG. 14 illustrates a flow diagram of a process 1400 for auditing using a GlobalBuffer auditing region in the memory system. In the global auditing process 1400, the OS needs to initially allocate an auditing buffer, hereinafter called GlobalBuffer 1431. GlobalBuffer 1431 may be physically contiguous, and its physical address, in GlobalBuffer address field 1432, and size, in Global Buffer Size field 1438, are communicated initially to the memory controller 1404. The OS also needs to initialize the counter blocks with the correct FileID at the first minor page fault of each page. Furthermore, the memory controller 1404 needs to keep track of the current index in the Index Register field 1436 in the Global-Buffer 1431.

As shown in FIG. 14, on each file access the memory controller 1404 updates the GlobalBuffer 1431 having a GlobalBuffer address field 1432. At Step S1401 of process 1400, the cache hierarchy 1466 may send a request for a read or write of a file. Since the GlobalBuffer 1431 is shared across all files, the memory controller 1404 has to also write the FileID at FileID field 1459 in the NVM memory 1450, at Step S1403 of process 1400. The auditing process may require information that needs to be written on each file access are the FileID, Process ID, access type (read or write), timestamp and physical address, at Step S1402 of process 1400. In other embodiments, all this information is available to the memory controller 1404 when using the filesystem encryption scheme. However, in case the FileID is not available to the memory controller 1404 through encryption counter blocks, metadata blocks for files' pages may be allocated to hold such information and such metadata blocks can be directly obtained by memory controller similar to encryption counter blocks.

In the NVM 1450 the GlobalBuffer memory 1453 stores the data of the GlobalBuffer 1431 of the memory controller 1405. The GlobalBuffer memory 1453 may include two bits 1453A and 1453B for additional tracking and/or coding of auditing functions.

Per-File Auditing Region

In contrast to GlobalBuffer scheme, each file will have its own auditing space. Accordingly, the memory controller write audit logs to the auditing region corresponds to the accessed file.

One way to maintain the current indices and physical addresses of auditing regions is inside the OTT table described previously or a similar structure. If such information does not exit, the memory controller 1404 should know where the OS stores the table of FileIDs and their corresponding auditing regions and obtain them and cache them in OTT similar to what happens when opening a new file. The trade-off here is more information per file but at the cost of more bookkeeping overhead of auditing region descriptors.

The embodiments address a means for supporting filesystem auditing in directly-accessible byte-addressable NVMs. For example, a hardware/software co-design approach that enables OS to track and audit filesystem accesses that occur by applications may be employed.

The embodiments may require slight modifications to the OS and hardware and may add overheads to performance. Every file access in memory will require writing to the auditing buffer. Furthermore, most NVMs have limited write endurance, thus in some embodiments, the process may only write logs for accesses to files of interest and deploy some write-reduction techniques. Moreover, high-resolution auditing can occupy memory banks frequently, thus can degrade memory system performance. Other auditing optimization schemes may be used to ensure performance, power and write endurance.

Supporting Flexible and High-Resolution Auditing

Unfortunately, limited-size logs can be challenging for forensics purposes, especially for huge files. For instance, if a limited size global buffer is maintained that is used to store auditing information and a suspicious activity is detected, the chance that useful information exist on the buffer depends on the size of the buffer and number of file accesses incurred. Accordingly, a higher resolution activity is needed for files of interest. For instance, if a file contains a database, the auditing process collects information that indicates that last update or read of each small chunk of the database. Since the embodiments deal with cache block size at the memory controller, this chunk size can be as small as 64 bytes. Accordingly, an auditing space for each 64B of files of interest may be used. On each file of interest, would be able to choose what information is needs to store and its length. For instance, it might be preferable for sensitive files to keep track of last N accesses for each 64B, and such accesses can be reads or writes. However, for some other files, track of write accesses may be kept and tracked.

Figure 15:
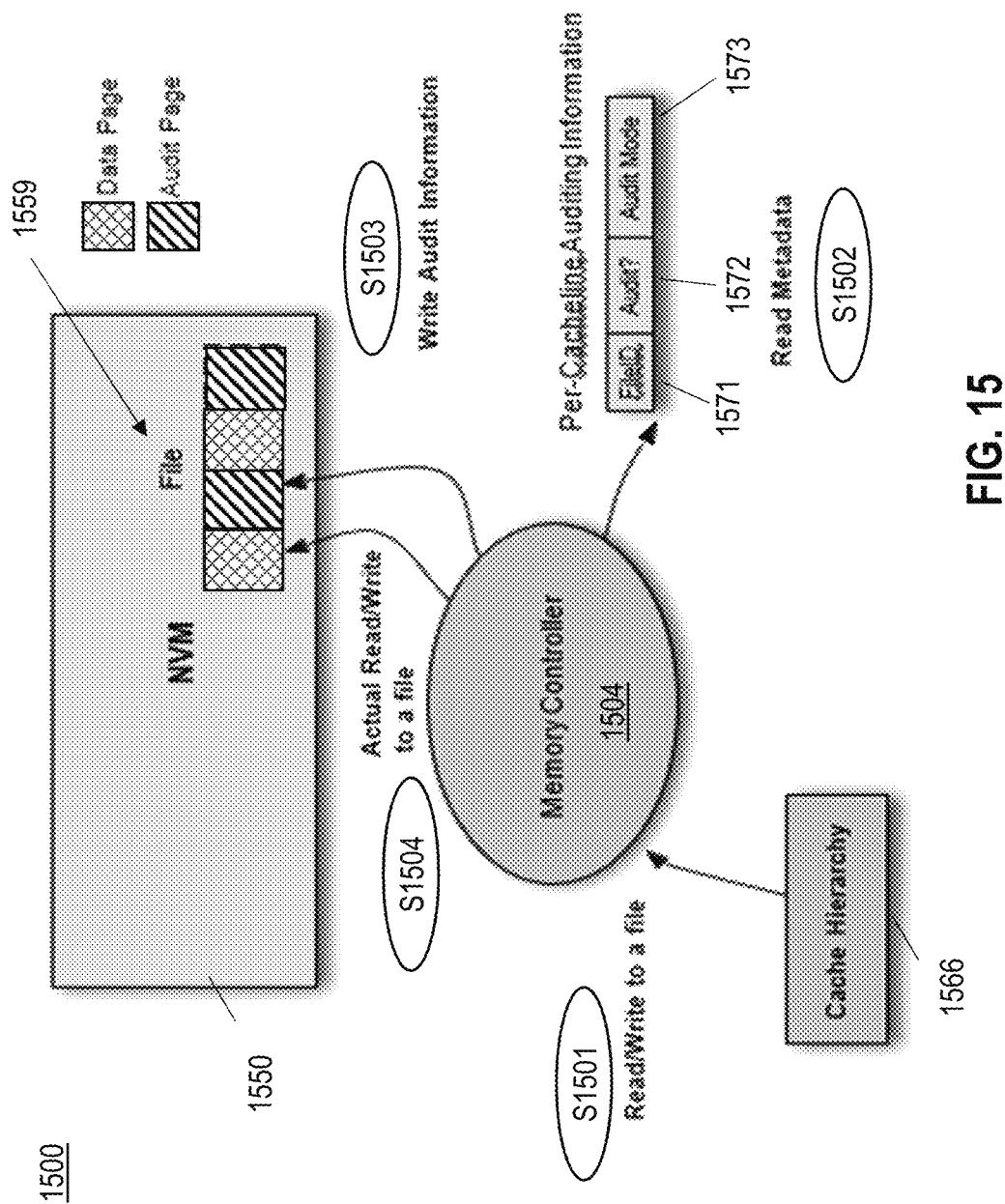
FIG. 15 illustrates a flow diagram of a high-resolution and flexible auditing scheme.

FIG. 15 illustrates a flow diagram of a process 1500 for a high-resolution and flexible auditing system. Initially, as shown in Step S1501 of process 1500, a request arrives to the memory controller 1504 to read a cache block from NVM memory 1550 or to write a cache block to memory via a cache hierarchy 1566. Since the requests can be directed to conventional memory regions or files, there should be a mechanism to help identifying target FileID and if to audit this transaction or not. Accordingly, in Step S1502 of process 1500, the memory controller 1504 finds out which file is being accessed and what type of information to write (if audited). There are many ways on how this information can be stored and obtained but vary in performance overheads and complexity. The simplest way to implement such auditing information is to encode them on file or memory encryption counter blocks similar to the scheme according to a directly-accessible and encrypted filesystems through HW/SW configuration. Since such counter blocks need to be obtained before completing any read/write requests, the auditing metadata, at Step S1502 of process 1500, is obtained for almost free cost. In fact, much of the information, such as FileID in a FileID field 1571, can be directly used from counter blocks. To know if the file is being audited or not, an Audit? field 1572 may be added to be part of such metadata. Finally, to know what auditing information needs to be written, an Audit Mode field 1573 may be added. Note that Audit? Field 1572 could be encoded through one of the auditing modes instead of having a separate field (e.g., Audit Mode value 0 means auditing is disabled for this file). Audit Mode field 1573 can be as small as 2 bits. Example of active auditing modes are only reads are audited, only writes are audited, both are audited or no auditing at all.

To avoid adding complexity to find out where to write the audit per cache line, when the OS initially allocates pages for a file to be audited, it also allocates an auditing page following each actual file page. Accordingly, the memory controller 1504 knows that the auditing information which is written to the cache line at Step S1503 of process 1500 corresponds to the read/write request but in the next physical page. At Step S1504 of process 1500, the memory controller 1504 may actually write/read to file associated with the request. Note that for filesystem auditing to be effective, the process will track and/or determine which process is actually accessing the data, thus a CPT table is needed similar to what was discussed previously.

The embodiments may employ hardware-assisted logging in directly accessible filesystems. Furthermore, the auditing process may audit at very small granularity with different auditing options.

For instance, some embodiments may determine if the file being accessed does not use encryption or counter blocks. Furthermore, the embodiments may dynamically change auditing mode for a file. The embodiments may provide a high-resolution flexible auditing scheme. The embodiments may efficiently recognize the access target (file or memory) and FileID, even in systems without filesystem encryption. For example, the OS explicitly communicating, to the memory controller 1504, the physical ranges to be audited apriori once opening a file may be employed in some embodiments. Furthermore, some embodiments may change auditing information dynamically.

The embodiments may employ state-of-the-art in-memory database applications and persistent applications.

With ever increasing number of security threats, it is becoming crucial to secure future computing systems. Unfortunately, due to the significant performance overheads for conventional security primitives, many users deviate from securing their data and files, leaving their data and files vulnerable for different types of attacks. Thus, the embodiments include hardware-support for encrypting and auditing byte-addressable NVM-based filesystems. Emerging NVMs have latencies that are comparable to dynamic random-access memory (DRAM) while enabling persistent applications such as filesystems. Accordingly, files can be accessed directly in NVMs that are connected through memory bus with high speeds. The performance overheads of conventional filesystem encryption become a serious bottleneck, hence discourage most users from encrypting their files. Accordingly, the embodiments herein may provide an efficient filesystem encryption mechanism that is transparent to users with negligible performance overheads. Furthermore, it allows the OS to audit important files for digital forensics purposes. Such hardware-support can unlock the performance benefits from using fast NVMs, but without sacrificing security.

Computational Hardware Overview

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 501 for processing information are coupled with the bus 510. A processor 501 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 501 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 501 to store temporary values during execution of computer instructions. The computer system 500 also includes a read only memory (ROM) 506, non-volatile persistent storage device or static storage device coupled to the bus 510 for storing static information, including instructions, that is not changed by the computer system 500. The ROM 506 may be a secure byte-addressable memory (storage) device or a direct-access for files (DAX) memory device. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 501 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general, the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 501, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 501, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 501, except for carrier waves and other signals.

Logic encoded in one or more tangible media includes one or both of processor instructions on a computer-readable storage media and special purpose hardware, such as ASIC 520.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 501 executing one or more sequences of one or more instructions contained in memory 504. Such instructions, also called software and program code, may be read into memory 504 from another computer-readable medium such as storage device 508. Execution of the sequences of instructions contained in memory 504 causes processor 501 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 501 as it is received or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 501 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red a carrier wave serving as the network link 578. An infrared detector serving as communications interface 570 receives the instructions and data carried in the infrared signal and places information representing the instructions and data onto bus 510. Bus 510 carries the information to memory 504 from which processor 501 retrieves and executes the instructions using some of the data sent with the instructions. The instructions and data received in memory 504 may optionally be stored on storage device 508, either before or after execution by the processor 501.

Figure 6:
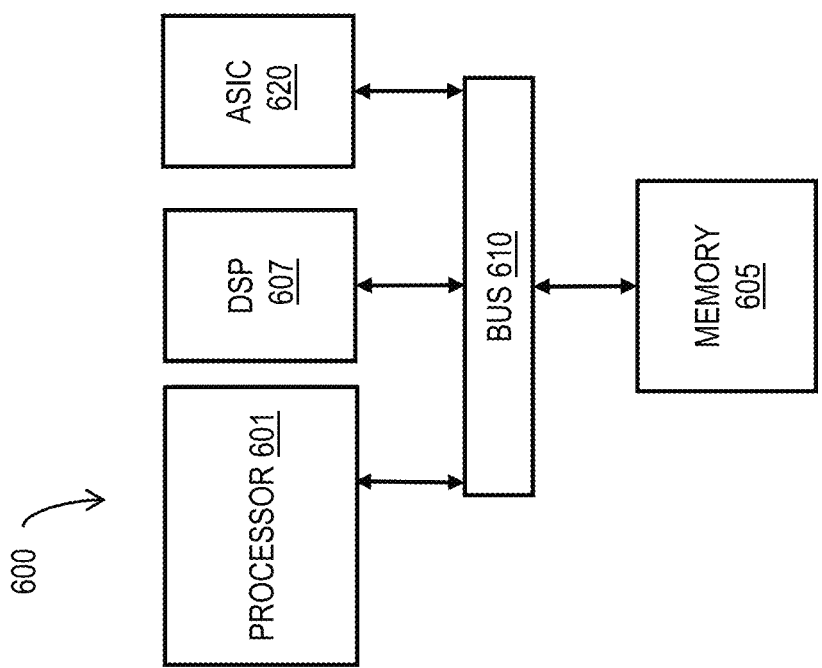
FIG. 6 illustrates a block diagram of a chip set upon which an embodiment of the invention may be implemented.

FIG. 6 illustrates an integrated circuit (IC) chip set 600 upon which an embodiment of the invention may be implemented. Chip set 600 is programmed to perform one or more steps of a method described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 610 for passing information among the components of the chip set 600. A chip or chip portion of the processor 601 has connectivity to the bus 610 to execute instructions and process information stored in, for example, a memory 605. The processor 601 may include one or more processing cores with each core configured to perform independently. A multi-core processor enables multiprocessing within a single physical package. Examples of a multi-core processor include two, four, eight, or greater numbers of processing cores. Alternatively, or in addition, the processor 601 may include one or more microprocessors configured in tandem via the bus 610 to enable independent execution of instructions, pipelining, and multithreading. The processor 601 may also be accompanied with one or more specialized components to perform certain processing functions and tasks such as one or more digital signal processors (DSP) 607, or one or more application-specific integrated circuits (ASIC) 620. A DSP 607 typically is configured to process real-world signals (e.g., sound) in real time independently of the processor 601. Similarly, an ASIC 620 may be implemented on at least one IC chip or chip portions and can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 601 and accompanying components have connectivity to the memory 605 via the bus 610. The memory 605 may include dynamic memory (e.g., RAM, magnetic disk, writable optical disk, etc.), static memory (e.g., ROM, CD-ROM, etc.) and/or secure persistent memory for storing executable instructions of applications that when executed perform one or more steps of a method described herein and for storing files including, without limitations, DAX filesystem files. The memory 605 also stores the data associated with or generated by the execution of one or more steps of the methods described herein. The memory 605 may be implemented on one or more IC chips.

Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article.

REFERENCES

The following references are incorporated herein by reference as if set forth in full below.

[1] "Linux Direct Access of Files (DAX)." [Online] Available: https://www.kernel.org/doc/Documentation/filesystems/dax.txt

[2] R. Love, "Kernel korner: Intro to inotify," Linux J., vol. 2005, no. 139, pp. 8-, November 2005. [Online] http://dl.acm.org/citation.cfm?id=1103050.1103058

[3] S. S. Hahn, S. Lee, C. Ji, L.-P. Chang, I. Yee, L. Shi, C. J. Xue, and J. Kim, "Improving file system performance of mobile storage systems using a decoupled defragmenter," in 2017 *USENIX Annual Technical Conference* (*USENIX ATC* 17). Santa Clara, Calif.: USENIX Association, 2017, pp. 759-771.[Online] https://www.usenix.org/conference/atc17/technical-sessions/presentation/hahn

[4] Y. Zhang, C. Dragga, A. C. Arpaci-Dusseau, and R. H. Arpaci-Dusseau, "Viewbox: Integrating local file systems with cloud storage services," in *Proceedings of the 12th USENIX Conference on File and Storage Technologies* (*FAST* 14). Santa Clara, Calif.: USENIX, 2014, pp. 119-132. [Online]. https://www.usenix.org/conference/fast14/technical-sessions/presentation/zhang

[5] J. Oberheide, E. Cooke, and F. Jahanian, "Rethinking antivirus: Executable analysis in the network cloud," in *Proceedings of the 2Nd USENIX Workshop on Hot Topics in Security*, ser. HOTSEC'07. Berkeley, Calif., USA: USENIX Association, 2007, pp. 5:1-5:5. [Online] Available: http://dl.acm.org/citation.cfm?id=1361419.1361424

[6] A. Case and G. G. Richard, "Advancing mac os x rootkit detection," *Digit. Investig.*, vol. 14, no. 51, pp. S25-S33, August 2015. [Online] https://doi.org/10.1016/j.diin.2015.05.005

[7] C. H. Malin, E. Casey, and J. M. Aquilina, *Malware forensics field guide for Linux systems: digital forensics field guides*. Newnes, 2013.

[8] S. Chhabra and Y. Solihin, "i-nvmm: A secure non-volatile main memory system with incremental encryption," in *Proceedings of the 38th Annual International Symposium on Computer Architecture*, ser. ISCA '11. New York, N.Y., USA: ACM, 2011, pp. 177-188. [Online]. Available: http://doi.acm.org/10.1145/2000064.2000086

[9] V. Young, P. J. Nair, and M. K. Qureshi, "Deuce: Write-efficient encryption for non-volatile memories," in *Proceedings of the Twentieth International Conference on Architectural Support for Programming Languages and Operating Systems*, ser. ASPLOS '15. New York, N.Y., USA: ACM, 2015, pp. 33-44. [Online] http://doi.acm.org/10.1145/2694344.2694387

[10] A. Awad, P. Manadhata, S. Haber, Y. Solihin, and W. Home, "Silent shredder: Zero-cost shredding for secure non-volatile main memory controllers," in *Proceedings of the Twenty-First International Conference on Architectural Support for Programming Languages and Operat-*

*ing Systems*, ser. ASPLOS '16. New York, N.Y., USA: ACM, 2016, pp. 263-276. [Online]. http://doi.acm.org/10.1145/2872362.2872377

[11] C. Yan, D. Englender, M. Prvulovic, B. Rogers, and Y. Solihin, "Improving cost, performance, and security of memory encryption and authentication," in *ACM SIGARCH Computer Architecture News*, vol. 34, no. 2. IEEE Computer Society, 2006, pp. 179-190.

[12] B. Rogers, S. Chhabra, M. Prvulovic, and Y. Solihin, "Using address independent seed encryption and bonsai merkle trees to make secure processors os- and performance-friendly," in *the proceedings of the 40th Annual IEEE/ACM International Symposium on Microarchitecture (MICRO-40)*, 2007, ser. MICRO 40. Washington, D.C., USA: IEEE Computer Society, 2007, pp. 183-196. [Online]. http://dx.doi.org/10.1109/MICRO.2007.44

[13] C. Yan, B. Rogers, D. Englender, D. Solihin, and M. Prvulovic, "Improving cost, performance, and security of memory encryption and authentication," in *the proceedings of the 33rd International Symposium on Computer Architecture (ISCA-33)*, 2006, 2006, pp. 179-190.

[14] M. Blaze, "A cryptographic file system for unix," in *Proceedings of the 1st ACM conference on Computer and communications security*. ACM, 1993, pp. 9-16.

[15] E. Zadok, I. Badulescu, and A. Shender, "Cryptfs: A stackable vnode level encryption file system," Tech. Rep.

[16] M. A. Halcrow, "ecryptfs: An enterprise-class encrypted filesystem for linux," in *Proceedings of the 2005 Linux Symposium*, vol. 1, 2005, pp. 201-218.

[17] G. Cattaneo, L. Catuogno, A. D. Sorbo, and P. Persiano, "The design and implementation of a transparent cryptographic file system for unix," in *Proceedings of the FREENIX Track: 2001 USENIX Annual Technical Conference*. Berkeley, Calif., USA: USENIX Association, 2001, pp. 199-212. [Online]. http://dl.acm.org/citation.cfm?id=647054.715628

[18] "FileVault 2." [Online] https://support.apple.com/en-us/HT204837

[19] "NetApp Storage Encryption." [Online] http://www.netapp.com/us/products/storage-security-systems/netapp-storage-encryption.aspx

[20] "Defense in Depth. A practical strategy for achieving Information Assurance in todays highly networked environments." [Online] Available: https://www.nsa.gov/ia/files/support/defenseindepth.pdf

[21] "Intel Protected File System Library Using Safe Guard Extensions." [Online]. https://software.intel.com/en-us/articles/overview-of-intel-protected-file-system-library-using-software-guard-extensions.

[22] F. McKeen, I. Alexandrovich, I. Anati, D. Caspi, S. Johnson, R. Leslie-Hurd, and C. Rozas, "Intel® software guard extensions (intel® sgx) support for dynamic memory management inside an enclave," in *Proceedings of the Hardware and Architectural Support for Security and Privacy 2016*, ser. HASP 2016. New York, N.Y., USA: ACM, 2016, pp. 10:1-10:9. [Online] Available: http://doi.acm.org/10.1145/2948618.2954331

[23] B. C. Lee, P. Zhou, J. Yang, Y. Zhang, B. Zhao, E. Ipek, O. Mutlu, and D. Burger, "Phase-change technology and the future of main memory," *IEEE micro*, no. 1, pp. 143-143, 2010.

[24] B. Lee, E. Ipek, O. Mutlu, and D. Burger, "Architecting phase change memory as a scalable dram alternative," in *International Symposium on Computer Architecture (ISCA)*, 2009.

[25] Z. Li, R. Zhou, and T. Li, "Exploring high-performance and energy proportional interface for phase change memory systems," *IEEE 20th International Symposium on High Performance Computer Architecture (HPCA)*, pp. 210-221, 2013.

[26] C. Chen, J. Yang, Q. Wei, C. Wang, and M. Xue, "Fine-grained metadata journaling on nvm," in *Mass Storage Systems and Technologies (MSST), 2016 32nd Symposium on*. IEEE, 2016, pp. 1-13.

[27] J. Condit, E. B. Nightingale, C. Frost, E. Ipek, B. Lee, D. Burger, and D. Coetzee, "Better i/o through byte-addressable, persistent memory," in *Proceedings of the ACM SIGOPS 22nd symposium on Operating systems principles*. ACM, 2009, pp. 133-146.

[28] L. Marmol, J. Guerra, and M. K. Aguilera, "Non-volatile memory through customized key-value stores," in *8th USENIX Workshop on Hot Topics in Storage and File Systems (HotStorage 16)*. Denver, Colo.: USENIX Association, 2016. [Online]. Available: https://www.usenix.org/conference/hotstorage16/workshop-program/presentation/marmol

[29] S. Venkataraman, N. Tolia, P. Ranganathan, and R. H. Campbell, "Consistent and durable data structures for non-volatile byte-addressable memory," in *Proceedings of the 9th USENIX conference on File and storage technologies*. USENIX Association, 2011, pp. 5-5.

[30] J. Xu and S. Swanson, "Nova: A log-structured file system for hybrid volatile/non-volatile main memories," in *14th USENIX Conference on File and Storage Technologies (FAST 16)*. Santa Clara, Calif.: USENIX Association, 2016, pp. 323-338. [Online] https://www.usenix.org/conference/fast16/technical-sessions/presentation/xu

[31] "Linux Programmer's Manual: Linux Keyring." [Online] http://man7.org/linux/man-pages/man7/keyrings.7.html

[32] "Intel sgx programming reference." September 2013. [Online] Available: https://software.intel.com/sites/default/files/managed/48/88/329298-002.pdf

[33] S. Gueron, "A memory encryption engine suitable for general purpose processors," *IACR Cryptology ePrint Archive*, vol. 2016, p. 204, 2016.

[34] D. Kaplan, J. Powell, and T. Woller, "Amd memory encryption," 2016. [Online]. http://amd-dev.wpengine.netdna-cdn.com/wordpress/media/2013/12/AMD Memory Encryption Whitepaper v7-Public.pdf

[35] N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 simulator," *SIGARCH Comput. Archit. News*, vol. 39, no. 2, pp. 1-7, August 2011. [Online] http://doi.acm.org/10.1145/2024716.2024718

[36] A. Patel, F. Afram, S. Chen, and K. Ghose, "Marss: a full system simulator for multicore x86 cpus," in *Proceedings of the 48th Design Automation Conference*. ACM, 2011, pp. 1050-1055.

[37] "Engineering Reliable Persistence." [Online]. https://www.sigarch.org/engineering-reliable-persistence/

[38] "McNair Scholars Program." [Online] https://mcnairscholars.com/about/

[39] "UCF's EXCEL Program." [Online] https://excel.ucf.edu/

I claim:

1. A method comprising:
receiving a command by an operating system (OS);
initializing, by a memory controller of a secure processor, a file identification (FID) field and a file type field in a memory encryption counter block associated with pages for each file of a plurality of files stored in a byte-addressable persistent memory device (PMD), in response to the command by the OS wherein the file type field identifies whether said each file associated with FID field is one of an encrypted file and a memory location; and receiving a read command by a requesting core;

decrypting, by an encryption/decryption engine, data of a requested page stored in the byte-addressable PMD, in response to a read command by a requesting core, wherein the decrypting comprises:

determining that the requested page is an encrypted file; and in response to determining the requested page is an encrypted file, performing decryption based on a first encryption pad generated as a function of a file encryption key (FEK) of the encrypted file and a file encryption counter associated with a file encryption counter block and a second encryption pad generated as a function of a processor key of the secure processor and a counter associated with the memory encryption counter block.

2. The method of claim 1, further comprising:

tracking, in a current process table (CPT), for each core of a plurality of cores, a current process identification (PID) by corresponding core identification (CID), wherein the CPT being stored on a processor chip; and tracking in an open tunnel table (OTT), for each current PID, an associated FID and file encryption key (FEK), wherein the OTT being stored on the processor chip.

3. The method of claim 1, further comprising:

tracking, for each core of a plurality of cores, a process identification (PID) associated with a current process for said each core, wherein the PID is accessible by the OS executed by the secure processor;

generating, by the memory controller, the file identification (FID) associated with a direct access to file (DAX) filesystem file in response to the command from the OS;

determining, by the memory controller, a current index of a designated buffer, in the PMD, for which to store access auditing information associated with the DAX filesystem file;

accessing and/or modifying one or more DAX filesystem files of a plurality of DAX filesystem files stored in the PMD; and for each corresponding DAX filesystem file of the plurality of DAX filesystem files stored in the PMD, tracking access auditing information including the generated FID, an associated PID, access type, current timestamp and a physical address associated with the current index of the designated buffer for which the auditing information is stored, in response to the corresponding DAX filesystem file being accessed and/or modified.

4. The method of claim 1, further comprising:

generating auditing metadata information associated with a file wherein the auditing information including a field for identifying the FID and an Audit field indicating to audit requests for the file;

receiving a request by the memory controller to read a cache block from the PMD wherein the request includes the auditing information;

determining by the memory controller which file is being accessed based on the FID and a type of information to write to the PMD in response to the Audit field indicating to audit requests for the file; and encoding the auditing information on the file encryption counter block or the memory encryption counter block.

5. The method of claim 1, further comprising:

generating auditing metadata information associated with a file wherein the auditing information including a field for identifying the FID and an Audit field indicating to audit requests for the file;

receiving a request by the memory controller to write a cache block to the PMD wherein the request includes the auditing information;

determining by the memory controller which file is being accessed based on the FID and a type of information to write to the PMD in response to the Audit field indicating to audit requests for the file; and encoding the auditing information on the file encryption counter block or the memory encryption counter block.

6. The method of claim 1, further comprising:

incorporating the memory encryption counter block for each page into a unified encryption counter block and mode-switching counter block;

in response to receiving a memory request by the memory controller, fetching the unified encryption counter block for a corresponding file according to the FID stored in the unified encryption counter block;

determining a mode change;

storing, in the mode-switching counter block, a counter state of a previous mode;

sending by the OS executed on the processor, when a memory page is freed and allocated, a request to the memory controller to copy current counters in the unified encryption counter block to the mode-switching counter block;

initializing, by the OS executed on the processor, the unified encryption counter block wherein the mode change being one of memory-to-memory, file-to-file and file-to-memory; and in response to file-to-memory mode change, copying the mode-switching counter block to the unified encryption counter block, to establish the IVs for the encryption pads.

7. A system comprising:

a secure processor having a memory controller and an executable operating system (OS), the processor executing instructions stored in tangible and non-transitory memory configured to cause the processor to:

initialize a file identification (FID) field and a file type field in a memory encryption counter block associated with pages for each file of a plurality of files stored in a byte-addressable persistent memory device (PMD), in response to a command by the OS, wherein the file type field identifies whether said each file associated with FID field is one of an encrypted file and a memory location; and decrypt, by an encryption/decryption engine, data of a requested page stored in the byte-addressable PMD, in response to a read command by a requesting core, wherein the instructions to decrypt causes the processor to determine whether the requested page is an encrypted file or memory location; and in response to determining the requested page is an encrypted file, perform decryption based on a first encryption pad generated as a function of a file encryption key (FEK) of the encrypted file and a file encryption counter associated with a file encryption counter block and a second encryption pad generated as a function of a processor key of the secure processor and a counter associated with the memory encryption counter block.

8. The system of claim 7, wherein the processor further executing instructions to cause the processor to:
track, in a current process table (CPT), for each core of a plurality of cores, a current process identification (PID) by corresponding core identification (CID), wherein the CPT being stored on a processor chip; and
track in an open tunnel table (OTT), for each current PID, an associated FID and file encryption key (FEK), wherein the OTT being stored on the processor chip.

9. The system of claim 7, wherein the processor further executing instructions to cause the processor to:
track, for each core of a plurality of cores, a process identification (PID) associated with a current process for said each core, wherein the PID is accessible by the OS executed by the secure processor;
generate, by the memory controller, the file identification (FID) associated with a direct access to file (DAX) filesystem file in response to the command from the OS;
determine, by the memory controller, a current index of a designated buffer, in the PMD, for which to store access auditing information associated with the DAX filesystem file; and
for each corresponding DAX filesystem file of a plurality of DAX filesystem files stored in the PMD, track access auditing information including the generated FID, an associated PID, access type, current timestamp and a physical address associated with the current index of the designated buffer for which the auditing information is stored, in response to the corresponding DAX filesystem file being accessed and/or modified.

10. The system of claim 7, wherein the processor further executing instructions to cause the processor to:
generate auditing metadata information associated with a file wherein the auditing information including a field for identifying the FID and an Audit field indicating whether to audit requests for the file;
receive a request by the memory controller to read a cache block from the PMD wherein the request includes the auditing information;
determine by the memory controller which file is being accessed based on the FID and a type of information to write to the PMD in response to the Audit field indicating to audit requests for the file; and
encode the auditing information on the file encryption counter block or the memory encryption counter block.

11. The system of claim 7, wherein the processor further executing instructions to cause the processor to:
generate auditing metadata information associated with a file wherein the auditing information including a field for identifying the FID and an Audit field indicating whether to audit requests for the file;
receive a request by the memory controller to write a cache block to the PMD wherein the request includes the auditing information;
determining by the memory controller which file is being accessed based on the FID and a type of information to write to the PMD in response to the Audit field indicating to audit requests for the file; and
encode the auditing information on the file encryption counter block or the memory encryption counter block.

12. The system of claim 7, further comprising:
incorporate the memory encryption counter block for each page into a unified encryption counter block and mode-switching counter block;
in response to receiving a memory request by the memory controller, the unified encryption counter block is fetched for a corresponding file according to the FID stored in the unified encryption counter block;
determine a mode change;
store, in the mode-switching counter block, a counter state of a previous mode;
send, by the OS executed on the processor, when a memory page is freed and allocated, a request to the memory controller to copy current counters in the unified encryption counter block to the mode-switching counter block;
initialize, by the OS executed on the processor, the unified encryption counter block wherein the mode change being one of memory-to-memory, file-to-file and file-to-memory; and
in response to file-to-memory mode change, copy the mode-switching counter block to the unified encryption counter block, to establish the IVs for the encryption pads.

13. The system of claim 7, further comprising the byte-addressable persistent memory device (PMD).

14. A tangible and non-transitory computer readable medium having instructions stored thereon which when executed by a secure processor causes the secure processor to:
initialize a file identification (FID) field and a file type field in a memory encryption counter block associated with pages for each file of a plurality of files stored in a byte-addressable persistent memory device (PMD), in response to a command by the OS, wherein the file type field identifies whether said each file associated with FID field is one of an encrypted file and a memory location; and
decrypt, by an encryption/decryption engine, data of a requested page stored in the byte-addressable PMD, in response to a read command by a requesting core, wherein the instructions to decrypt causes the processor to
determine whether the requested page is an encrypted file or memory location; and
in response to determining the requested page is an encrypted file, perform decryption based on a first encryption pad generated as a function of a file encryption key (FEK) of the encrypted file and a file encryption counter associated with a file encryption counter block and a second encryption pad generated as a function of a processor key of the secure processor and a counter associated with the memory encryption counter block.

15. The computer readable medium of claim 14, wherein the instructions when executed by the processor to further cause the processor to:
track, in a current process table (CPT), for each core of a plurality of cores, a current process identification (PID) by corresponding core identification (CID), wherein the CPT being stored on a processor chip; and
track in an open tunnel table (OTT), for each current PID, an associated FID and file encryption key (FEK), wherein the OTT being stored on the processor chip.

16. The computer readable medium of claim 14, wherein the instructions when executed by the processor to further cause the processor to:
track, for each core of a plurality of cores, a process identification (PID) associated with a current process for said each core, wherein the PID is accessible by the OS executed by the secure processor;

generate, by the memory controller, the file identification (FID) associated with a direct access to file (DAX) filesystem file in response to the command from the OS;

determine, by the memory controller, a current index of a designated buffer, in the PMD, for which to store access auditing information associated with the DAX filesystem file; and for each corresponding DAX filesystem file of a plurality of DAX filesystem files stored in the PMD, track access auditing information including the generated FID, an associated PID, access type, current timestamp and a physical address associated with the current index of the designated buffer for which the auditing information is stored, in response to the corresponding DAX filesystem file being accessed and/or modified.

17. The computer readable medium of claim 14, wherein the instructions when executed by the processor to further cause the processor to:

generate auditing metadata information associated with a file wherein the auditing information including a field for identifying the FID and an Audit field indicating whether to audit requests for the file;

receive a request by the memory controller to read a cache block from the PMD wherein the request includes the auditing information;

determine by the memory controller which file is being accessed based on the FID and a type of information to write to the PMD in response to the Audit field indicating to audit requests for the file; and encode the auditing information on the file encryption counter block or the memory encryption counter block.

18. The computer readable medium of claim 14, wherein the instructions when executed to further cause the processor to:

generate auditing metadata information associated with a file wherein the auditing information including a field for identifying the FID and an Audit field indicating whether to audit requests for the file;

receive a request by the memory controller to write a cache block to the PMD wherein the request includes the auditing information;

determine by the memory controller which file is being accessed based on the FID and a type of information to write to the PMD in response to the Audit field indicating to audit requests for the file; and encode the auditing information on the file encryption counter block or the memory encryption counter block.

19. The computer readable medium of claim 14, wherein the instructions when executed to further cause the processor to:

incorporate the memory encryption counter block for each page into a unified encryption counter block and mode-switching counter block;

in response to receiving a memory request by the memory controller, the unified encryption counter block is fetched for a corresponding file according to the FID stored in the unified encryption counter block;

determine a mode change;

store, in the mode-switching counter block, a counter state of a previous mode;

send, by the OS executed on the processor, when a memory page is freed and allocated, a request to the memory controller to copy current counters in the unified encryption counter block to the mode-switching counter block;

initialize, by the OS executed on the processor, the unified encryption counter block wherein the mode change being one of memory-to-memory, file-to-file and file-to-memory; and in response to file-to-memory mode change, copy the mode-switching counter block to the unified encryption counter block, to establish the IVs for the encryption pads.

20. A method comprising:

tracking, for each core of a plurality of cores, a process identification (PID) associated with a current process for said each core, wherein the PID is accessible by an operating system (OS) executed by a processing unit;

receiving a command from the OS generating, by a memory controller, a file identification (FID) associated with a direct access to file (DAX) filesystem file in response to the command from the OS;

determining, by a memory controller, a current index of a designated buffer, in a secure persistent memory device, for which to store access auditing information associated with the DAX filesystem file;

accessing and/or modifying one or more DAX filesystem files of a plurality of DAX filesystem files stored in the secure persistent memory device; and for each corresponding DAX filesystem file of the plurality of DAX filesystem files stored in the secure persistent memory device, tracking access auditing information including the generated FID, an associated PID, access type, current timestamp and a physical address associated with the current index of the designated buffer for which the auditing information is stored, in response to the corresponding DAX filesystem file being accessed and/or modified.

* * * * *